US006495071B1

(12) United States Patent
Yokota et al.

(10) Patent No.: US 6,495,071 B1
(45) Date of Patent: Dec. 17, 2002

(54) METHOD OF USING ELECTRO-SENSITIVE MOVABLE FLUIDS

(75) Inventors: Shinichi Yokota, Sagamihara (JP); Yasufumi Otsubo, Chiba (JP); Kazuya Edamura, Tokyo (JP)

(73) Assignee: New Technology Management Co., Ltd., Tokyo (JP)

( * ) Notice: Subject to any disclaimer, the term of this patent is extended or adjusted under 35 U.S.C. 154(b) by 0 days.

(21) Appl. No.: 09/358,265

(22) Filed: Jul. 21, 1999

Related U.S. Application Data

(62) Division of application No. 08/792,544, filed on Jan. 31, 1997, now Pat. No. 6,030,544.

(30) Foreign Application Priority Data

| Feb. 1, 1996 | (JP) | ................................................ 8-16871 |
| Feb. 1, 1996 | (JP) | ................................................ 8-16872 |
| Mar. 29, 1996 | (JP) | ................................................ 8-76259 |

(51) Int. Cl.$^7$ ................................................ H01B 3/20
(52) U.S. Cl. ................ 252/578; 252/579; 252/73; 252/79; 415/90; 415/206; 417/48
(58) Field of Search ................ 252/73, 79, 579, 252/578; 415/206, 90; 417/48

(56) References Cited

U.S. PATENT DOCUMENTS

| 2,870,236 A | 1/1959 | Heininger ................ 174/17 |
| 2,949,550 A | 8/1960 | Brown ................ 310/5 |
| 3,518,462 A | 6/1970 | Brown ................ 310/10 |
| 4,282,386 A | 8/1981 | Donate et al. ................ 568/606 |
| 4,664,100 A | * 5/1987 | Rudloff ................ 128/79 |
| 4,802,560 A | * 2/1989 | Bhadrea et al. ................ 188/264 F |
| 5,186,604 A | * 2/1993 | Iorio et al. ................ 415/90 |
| 5,374,367 A | 12/1994 | Edamura et al. ................ 252/79 |
| 5,576,747 A | * 11/1996 | Sohn ................ 347/48 |
| 5,679,820 A | * 10/1997 | Pickett et al. ................ 556/436 |
| 5,746,934 A | * 5/1998 | Sasaki et al. ................ 252/77 |

FOREIGN PATENT DOCUMENTS

| EP | 0202878 | 11/1986 |
| EP | 0588482 | 3/1994 |
| EP | 0695025 | 1/1996 |
| JP | 5032988 | 2/1993 |
| JP | 6049478 | 2/1994 |
| JP | 6057274 | 3/1994 |
| JP | 7238292 | 9/1995 |
| JP | 8170087 | 7/1996 |
| JP | 8226375 | 9/1996 |
| JP | 8284798 | 10/1996 |

OTHER PUBLICATIONS

Communication from EPO, May 9, 1997 (1 p.); European Search Report, Apr. 24, 1997 (1 p.); Annex to the European Search Report, Apr. 24, 1997 (1 p.).

(List continued on next page.)

*Primary Examiner*—Yogendra N. Gupta
*Assistant Examiner*—Derrick G Hamlin
(74) *Attorney, Agent, or Firm*—Webb Ziesenheim Logsdon Orkin & Hanson, P.C.

(57) ABSTRACT

Provided is a method for creating fluid motion of an electro-sensitive movable fluid upon application of direct-current-voltage between two electrodes adjacent the fluid, the fluid having a conductivity σ, and a viscosity η located inside a triangle in a graph showing a relation between a conductivity σ plotted as abscissa, and a viscosity η, plotted as ordinate, of a fluid at the working temperature, said triangle having, as vertices, a point P indicated by the conductivity $\sigma = 4 \times 10^{-10}$ S/m and the viscosity $\eta = 1 \times 10^{0}$ Pa·s, a point Q indicated by the conductivity $\sigma = 4 \times 10^{-10}$ S/m and the viscosity $\eta = 1 \times 10^{-4}$ Pa·s, and a point R indicated by the conductivity $\sigma = 5 \times 10^{-6}$ S/m and the viscosity $\eta = 1 \times 10^{-4}$ Pa·s.

10 Claims, 11 Drawing Sheets

OTHER PUBLICATIONS

Crowley, Joseph M. et al. "Selecting a Working Fluid to Increase the Efficiency and Flow Rate of an EHD Pump", IEEE Transactions on Industry Applications, Jan./Feb. 1990, No. 1, pp. 42–49.

Secker, P.E. et al., "A Miniature Multipole Liquid–Immersed Dielectric Motor", Jul. 14, 1969; J. Phys. D: Appl. Phys., 1970, vol. 3, pp. 216–220.

Shulman, Zinoviy P, et al. "Rotation of the Axisimmetric Dielectric Bodies (DEB) in Electrorheological Suspensions (ERS)"; Proceedings of the 5th International Conference on Electro–Rheological Fluids, Magneto–Rheological Suspensions and Associated Technology, Jul. 10–14, 1995, pp. 72–84.

Haga, Masakazu et al., "Effect of Electric Field on Marangoni Convection under Microgravity" J. Jpn. Soc. Microgravity Appl. vol. 12, No. 1, 1995, pp. 19–26.

Yabe, Akira et al., "Augmentation of Convective and Boiling Heat Transfer by Applying an Electro–Hydrodynamical Liquid Jet", Sep. 7, 1987; Int. J. Heat Mass Transfer, vol. 31, No. 2., pp. 407–417, 1988.

Tsuchida, Nuio, "The Electron Affinity and Ionization Energy of Various Impurities in Silicone Oil"; IEEE Transactions on Electrical Insulation, vol. 28, No. 2, Apr. 1993, pp. 243–252.

* cited by examiner

Fig.2
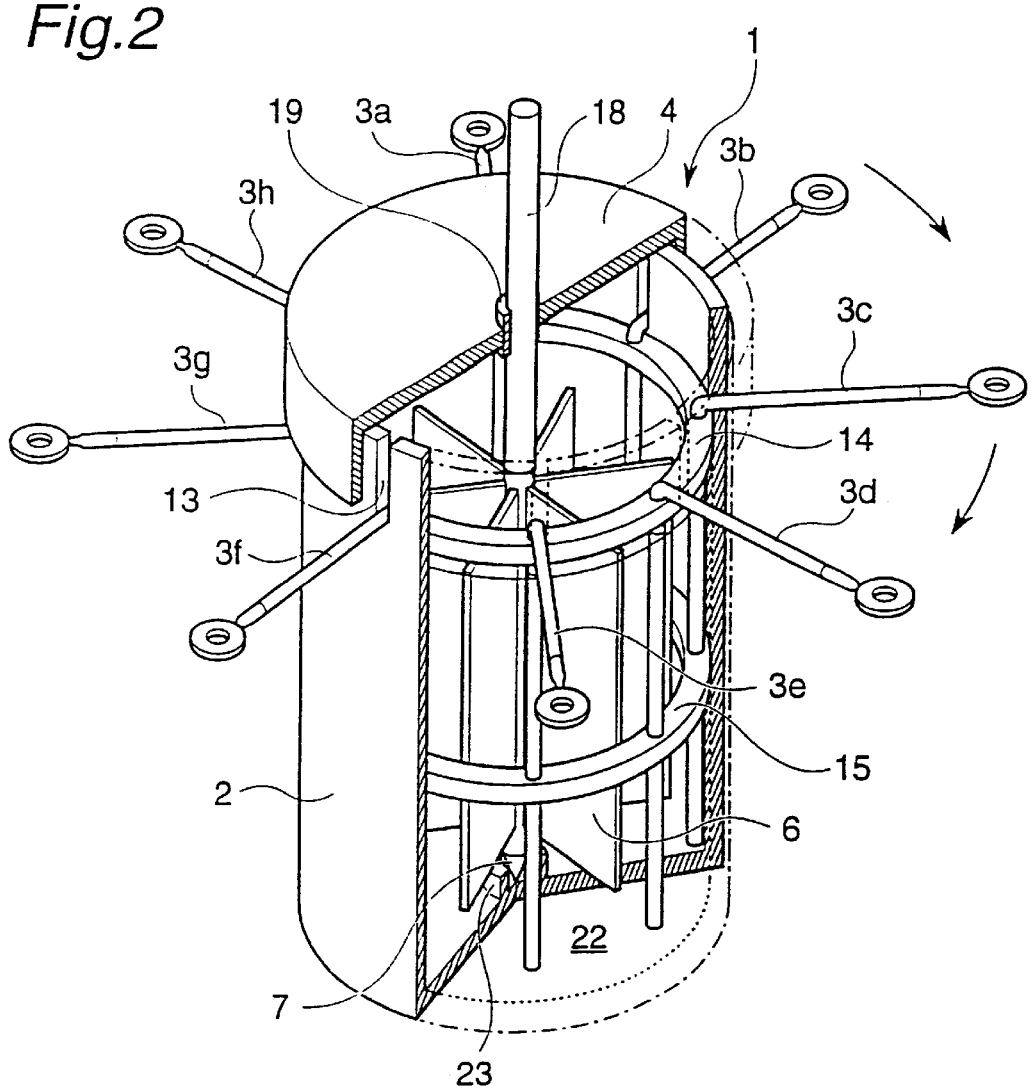
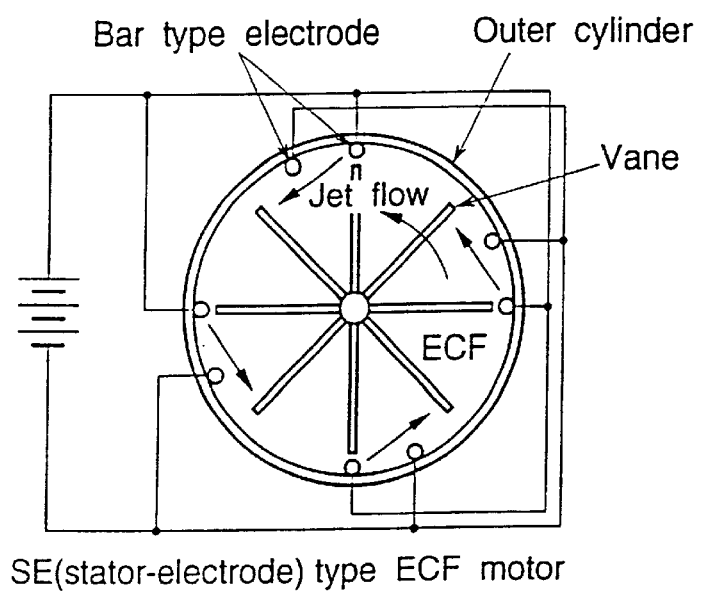
SE(stator-electrode) type ECF motor

RE(rotor-electrode) type ECF motor

Measuring devices
(a)for Rotational speed(b)for Current

Circulating Flow Pattern of Fluid

Relation applied voltage vs. rotational speed, applied voltage vs. current of ECF Motor (φ10[mm])

Fig.8

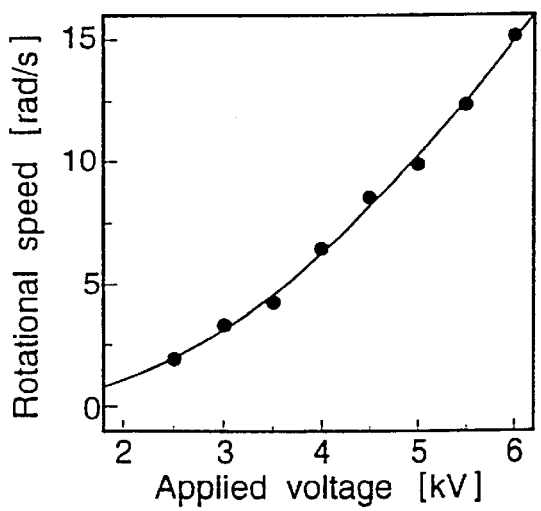

(a) Relation between rotational speed and applied voltage of the SE type ECF motor (number of vanes: 8, no-load)

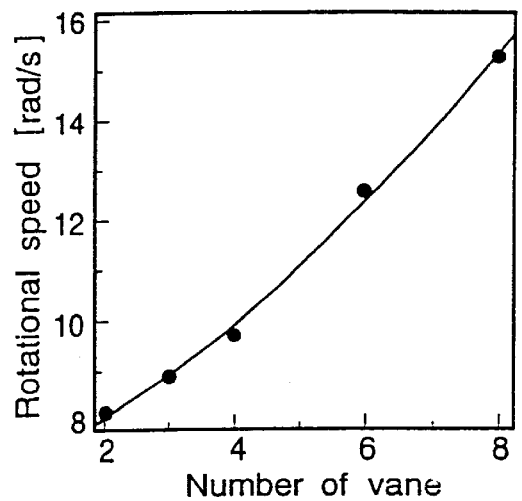

(b) Relation between rotational speed and number of vanes of the SE type ECF motor (applied voltage: 6[kV], no-load)

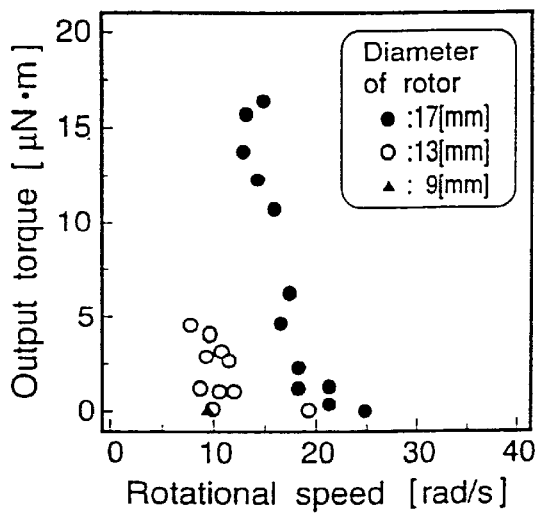

(c) Characteristics of the SE type ECF motor for different diameters of rotors (diameter of outer cylinder:20[mm])

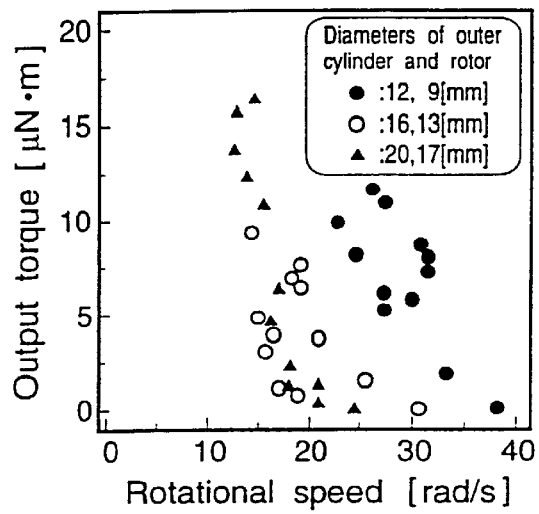

(d) Characteristics of the SE type ECF motor for different sizes

Fig.10
(a)
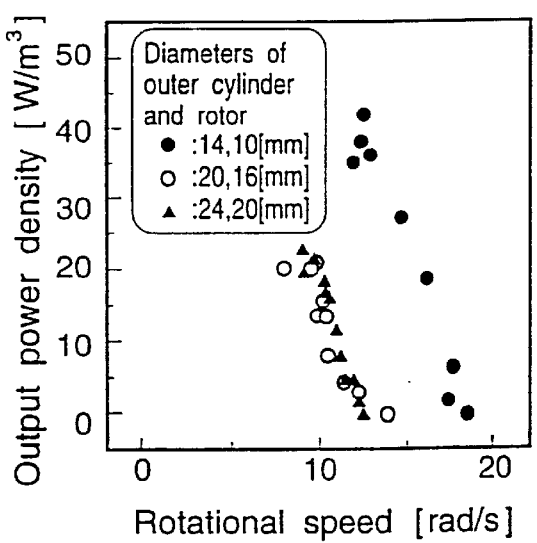
Miniaturization characteristics of the SE type ECF motor
(b)
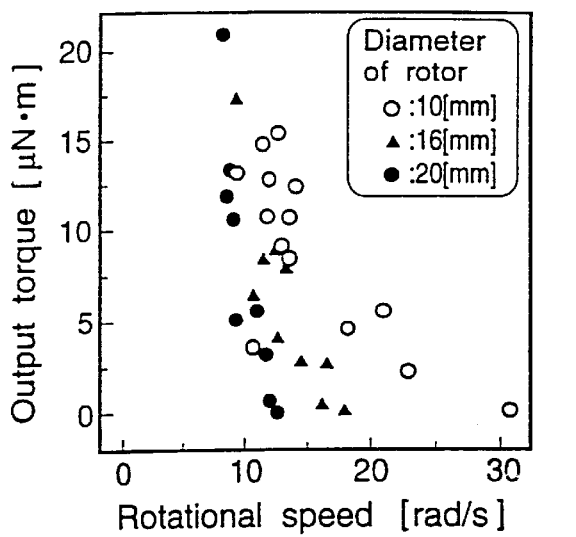
Characteristics of the rotor-electrode type ECF motor for different rotor diameters (outer cylinder diameter: 30[mm])
(c)
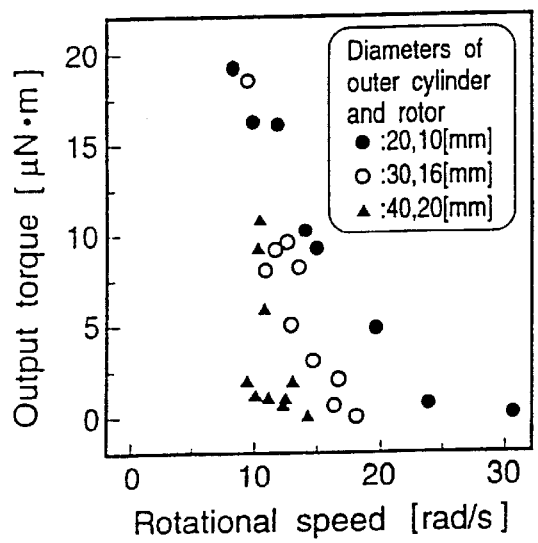
Characteristics of the rotor-electrode type ECF motor for different sizes

METHOD OF USING ELECTRO-SENSITIVE MOVABLE FLUIDS

CROSS-REFERENCE TO RELATED APPLICATION

This application is a division of U.S. patent application Ser. No. 08/792,544, filed Jan. 31, 1997, now U.S. Pat. No. 6,030,544 issued Feb. 29, 2000.

FIELD OF THE INVENTION

The present invention relates to electro-sensitive movable fluids which flow by application of a direct-current-voltage, methods of using the movable fluids and motors using the movable fluids.

BACKGROUND OF THE INVENTION

It is known that the characteristics of certain kinds of dielectric fluids vary when the dielectric fluids are subjected to electric fields. In case of liquid crystals, for example, when a voltage is applied to liquid crystal compounds in a liquid crystal phase (i.e., intermediate phase between a solid phase and a liquid phase), orientation properties of the compounds are controlled to thereby adjust light transmittance of the compounds, whereby visible images are formed. However, even if the liquid crystal compounds regulated by the orientation plates are placed in electric fields, they cannot flow freely because they are not liberated from the regulation.

Also, some fluids are known to exert an effect of variation of properties such as viscosity (electrical rheology effect or Winslow Effect).

The fluids exerting electrical rheology effect or Wien effect are generally colloidal dispersions wherein solid components, such as silica gel, cellulose, casein and polystyrene ion exchange resins, are mixed with insulating oils and dispersed in the oils, so that the storage stability of such fluids is low.

As lubricating oils for automobiles, those exhibiting electrical rheology effect have been proposed, but such lubricating oils are also heterogeneous and have a problem of low storage stability.

In Japanese Patent Laid-Open Publications No. 57274/1994 and No. 73390/1994, inventions of electrosensitive compositions wherein insulating oils are blended with specific fluorine compounds are disclosed.

The compositions disclosed in those publications are mixtures of insulating oils and fluorine compounds, and therefore they have a problem in the storage stability. Additionally, there is a worldwide tendency to avoid the use of fluorine compounds in recent years.

OBJECT OF THE INVENTION

An object of the present invention is to provide an electro-sensitive movable fluid which flows upon application of a direct-current-voltage, a method of using the movable fluid and a motor using the movable fluid.

More particularly, the object of the invention is to provide an electro-sensitive movable fluid, wherein jet flow is induced by the electric energy of a direct-current-voltage applied to the movable fluid, said jet flow of the movable fluid being able to be taken out as mechanical energy such as rotational energy.

It is another object of the invention to provide an energy conversion method using the electro-sensitive movable fluid wherein the electric energy of a direct-current-voltage applied to the movable fluid is converted to energy in the other form.

It is a further object of the invention to provide a novel motor using the electro-sensitive movable fluid.

SUMMARY OF THE INVENTION

The electro-sensitive movable fluid of the invention comprises a compound having a conductivity $\sigma$ and a viscosity $\eta$ located inside a triangle in a graph showing a relation between a conductivity $\sigma$, plotted as abscissa, and a viscosity $\eta$, plotted as ordinate, of a fluid at the working temperature, said triangle having, as vertexes, a point P indicated by the conductivity $\sigma=4\times10^{-10}$ S/m and the viscosity $\eta=1\times10^{0}$ Pa·s, a point Q indicated by the conductivity $\sigma=4\times10^{-10}$ S/m and the viscosity $\eta=1\times10^{-4}$ Pa·s, and a point R indicated by the conductivity $\sigma=5\times10^{-6}$ S/m and the viscosity $\eta=1\times10^{-4}$ Pa·s, or comprises a mixture of two or more kinds of compounds, said mixture being adjusted to have a conductivity $\sigma$ and a viscosity $\eta$ located inside said triangle.

The electro-sensitive movable fluid may be an inorganic compound or an organic compound. When the electro-sensitive movable fluid is an organic compound, this organic compound preferably is a chain or branched, substantially dielectric fluid compound containing molecular end group composed of alkyl groups, outer ends of said groups inactivated by hydrogen atoms bonding to the carbon atoms, said molecular end groups being united by bonding to each other at the inner ends, in which the bonding hand of each carbon atom for constituting the end groups with the sealed ends is bonded to at least one hetero atom and further linked to a straight-chain divalent hydrocarbon group, which may have a hetero atom and may have a branch, through the hetero atom, or is bonded to a divalent hydrocarbon group which may have a hetero atom or may have a branch.

When a voltage is applied between at least two electrodes arranged in the electro-sensitive movable fluid of the invention, the electro-sensitive movable fluid can be moved in the direction of one electrode to the other electrode.

Further, using the electro-sensitive movable fluid, the electric energy can be converted to energy of other form by a method comprising the steps of arranging at least one pair of electrodes in the electro-sensitive movable fluid, applying a voltage between the electrodes to form jet flow of the electro-sensitive movable fluid at a velocity corresponding to the applied electric energy, and converting fluid energy of the jet flow of the electro-sensitive movable fluid to mechanical energy capable of being taken out. In this case, the energy conversion using the electro-sensitive movable fluid can be controlled by a method comprising the steps of arranging at least one pair of electrodes in a container filled with the electro-sensitive movable fluid, applying a direct-current-voltage between the electrodes to convert electric energy to fluid energy of the electro-sensitive movable fluid by changing the applied direct-current-voltage in a range of 0.1 V to 10 kV to control the flow velocity and the flow direction of the electro-sensitive movable fluid in proportion to the applied direct-current-voltage, and converting the fluid energy of the movable fluid to mechanical energy capable of being taken out.

The first motor for electro-sensitive movable fluid (referred to as "RE type ECF motor" hereinafter, ECF: electro-conjugated fluid), which is preferably employed for the energy conversion, includes a container to be filled with an electro-sensitive movable fluid, a lid to close the container by being engaged with the open top of the container, a cylindrical rotor rotatable inside the fluid container around a rotating shaft borne by a shaft hole provided at the center of the lid and a bearing section provided at the center of the bottom of the container, plural first electrodes which are electrically connected with external electrode terminals through the rotating shaft at the upper part of the cylindrical rotor and arranged in the vertical direction on the surface of the cylindrical rotor, and second electrodes which are electrically connected with external electrode terminals through the rotating shaft at the lower part of the cylindrical rotor and arranged in non-contact with the first electrodes and in the vertical direction on the surface of the cylindrical rotor. The electro-sensitive movable fluid of the invention can drive the second motor for electro-sensitive movable fluid (referred to as "SE type ECF motor" hereinafter) other than the RE type ECF motor. The SE type ECF motor includes a cylindrical container to be filled with the electro-sensitive movable fluid, a lid of the container and a vane rotor, vanes of which detect motion of the movable fluid induced by application of a voltage to thereby rotate the rotor. The cylindrical container is provided with slits where the electrodes are arranged, and from the slits at least one pair of electrodes extend along the inner wall surface of the container.

As described above, the RE type ECF motor includes a container to be filled with an electro-sensitive movable fluid, a lid to close the container by being engaged with the open top of the container, a cylindrical rotor rotatable inside the container around a rotating shaft borne by a shaft hole provided at the center of the lid and a bearing section provided at the center of the bottom of the container, plural first electrodes which are electrically connected with first external electrode terminals through the rotating shaft at the upper part of the cylindrical rotor and arranged in the vertical direction on the surface of the cylindrical rotor, and second electrodes which are electrically connected with second external electrode terminals through the rotating shaft at the lower part of the cylindrical rotor and arranged in non-contact with the first electrodes and in the vertical direction on the surface of the cylindrical rotor. In the case of this motor, when a direct-current-voltage is applied between the first and second electrodes, jet flow of the electro-sensitive movable fluid is produced in the fluid container, whereby the rotor can be rotated together with the electrodes.

When a certain kind of dielectric fluid (i.e., "electro-sensitive movable fluid" of the invention) is subjected to an electric field, an electric force is generated in the fluid owing to the nonuniformity of electric conductivity and dielectric constant inside the fluid. In the direct current field, the Coulomb force acting on space charge dominates the dielectrophoretic force. The Coulomb force causes hydrodynamic instability, resulting in occurrence of convection of the electro-sensitive movable fluid or a secondary motion of the fluid. These phenomena are called "eletrohydrodynamic (EHD) effects".

The present inventors have found that the electric energy can be readily converted to mechanical energy utilizing the EHD effects and succeeded in specifying a dielectric fluid capable of exerting the EHD effects. That is, the electro-sensitive movable fluid of the invention inherently is a dielectric fluid, but when the movable fluid is subjected to an electric field, electric current is brought about, though it is very small. When a direct-current-voltage is applied to the electro-sensitive movable fluid as described above, the movable fluid is moved owing to the EHD effects, whereby jet flow of the movable fluid is generated. The intensity (or rate) of the jet flow varies with the applied direct-current-voltage. Therefore, when the motion (jet flow) of the electro-sensitive movable fluid is captured and taken out, the electric energy can be utilized as mechanical energy transformed from the electric energy.

The present inventors consider that the motion of the electro-sensitive movable fluid in the invention is owing to the EHD effects. This means that the present inventors consider that the phenomenon occurring in the invention can be related with the "EHD effects", but they do not conclude that the phenomenon occurring in the invention is owing to the "EHD effects".

BRIEF DESCRIPTION OF THE DRAWINGS

FIG. 2 schematically shows an embodiment of the SE type ECF motor using the electro-sensitive movable fluid and an embodiment of arrangement of the electrodes.

Figure 4:
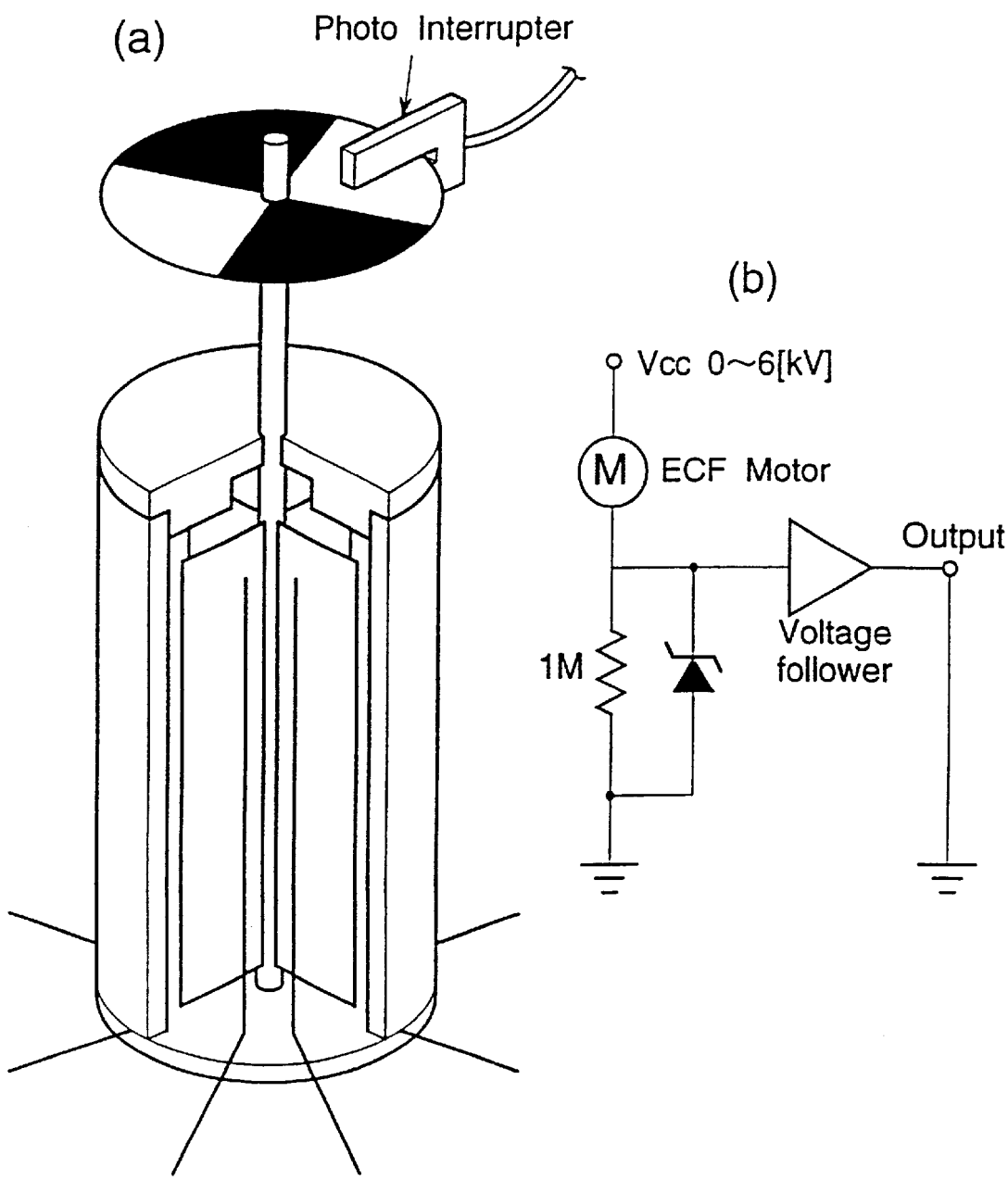

1: SE type ECF motor
2: container (outer cylinder)
4: lid
3a, 3b, 3c, 3d, 3e, 3f, 3g, 3h: electrode
6: vane
18: vane rotor
22: electro-sensitive movable fluid
40: RE type ECF motor
41: container (outer cylinder)
42: second electrode
43: first electrode
44: lid
45: rotating shaft
46: cylindrical rotor
47: shaft hole
48: bearing section
49: bottom
50, 60: rotational contact point
52, 53: external terminal FIG. 4 schematically shows a device to measure output torque of the SE type ECF motor and the RE type ECF motor in Example 5.

Figure 5:
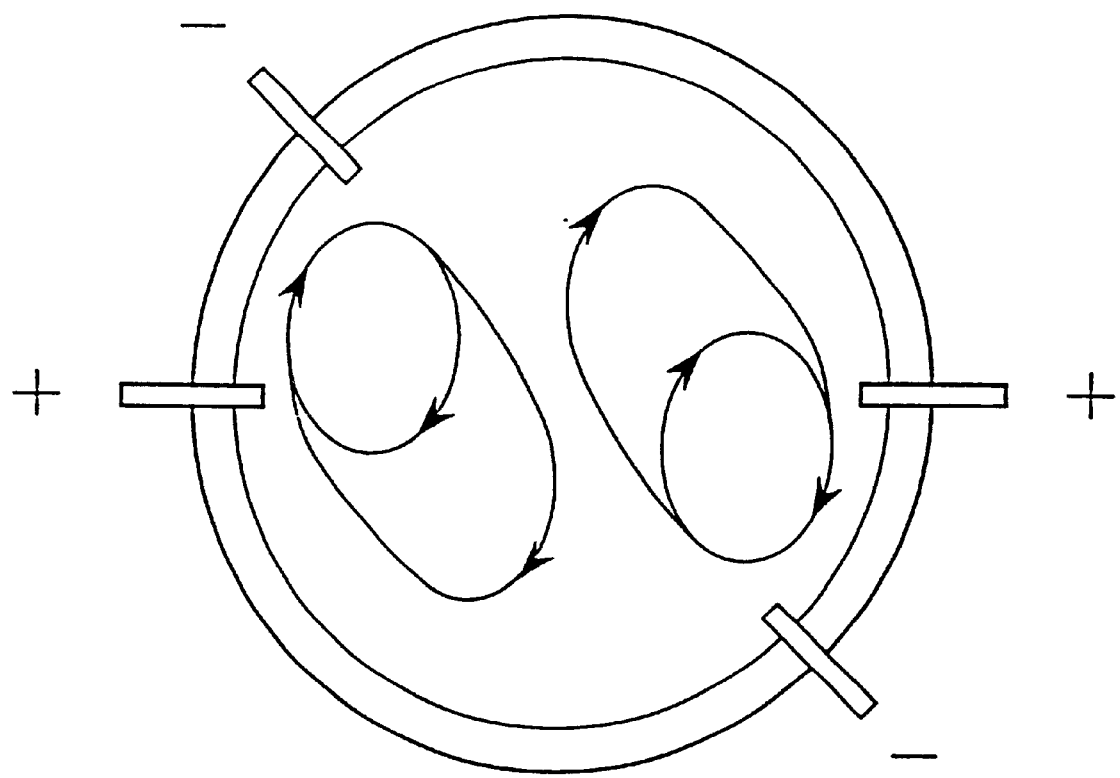

FIG. 5 shows an example of behaviors of the electro-sensitive movable fluid when a direct-current-voltage is applied to the movable fluid contained in the container.

Figure 6:
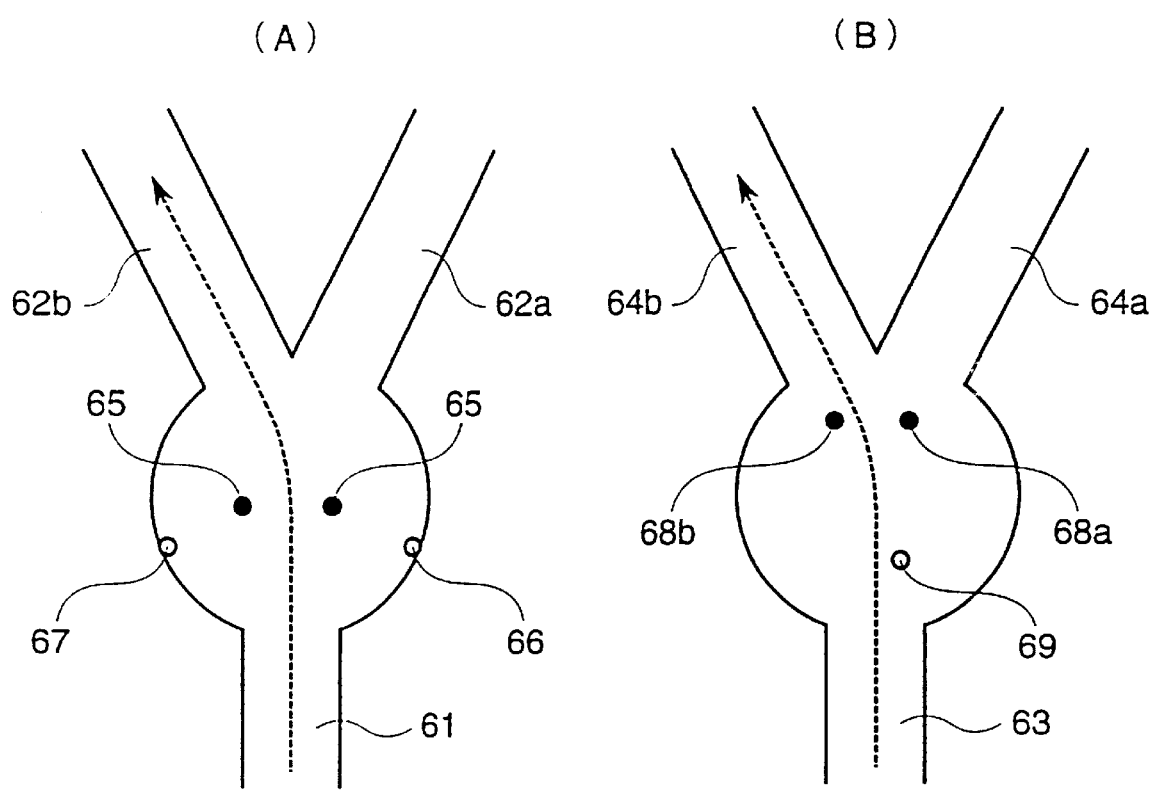

FIG. 6 schematically shows a fluidic component using electro-sensitive movable fluid.

Figure 7:
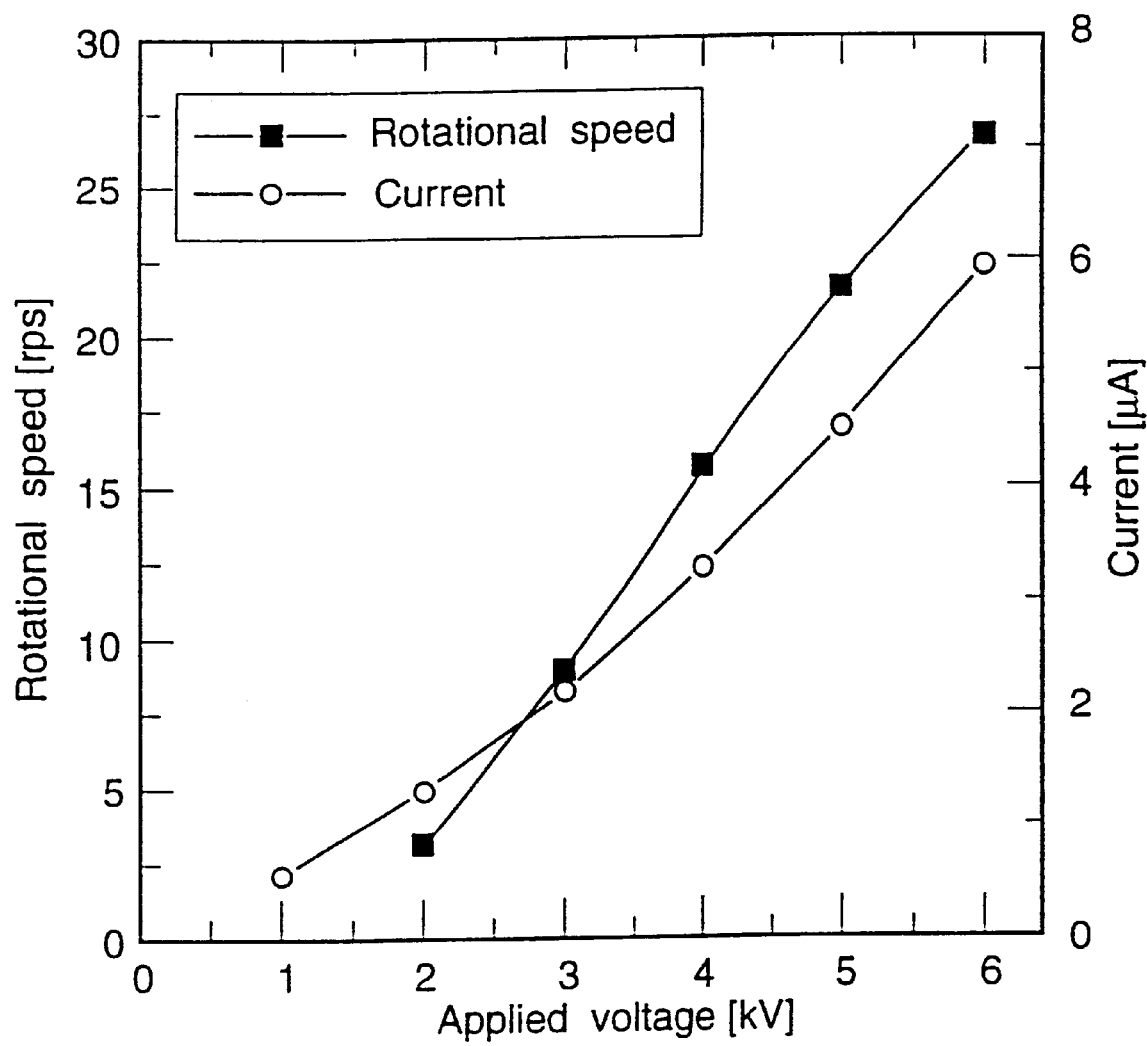

FIG. 7 graphically shows a relation between rotational speed and applied voltage and a relation between electric current and applied voltage in the SE type ECF motor.

Figure 9:
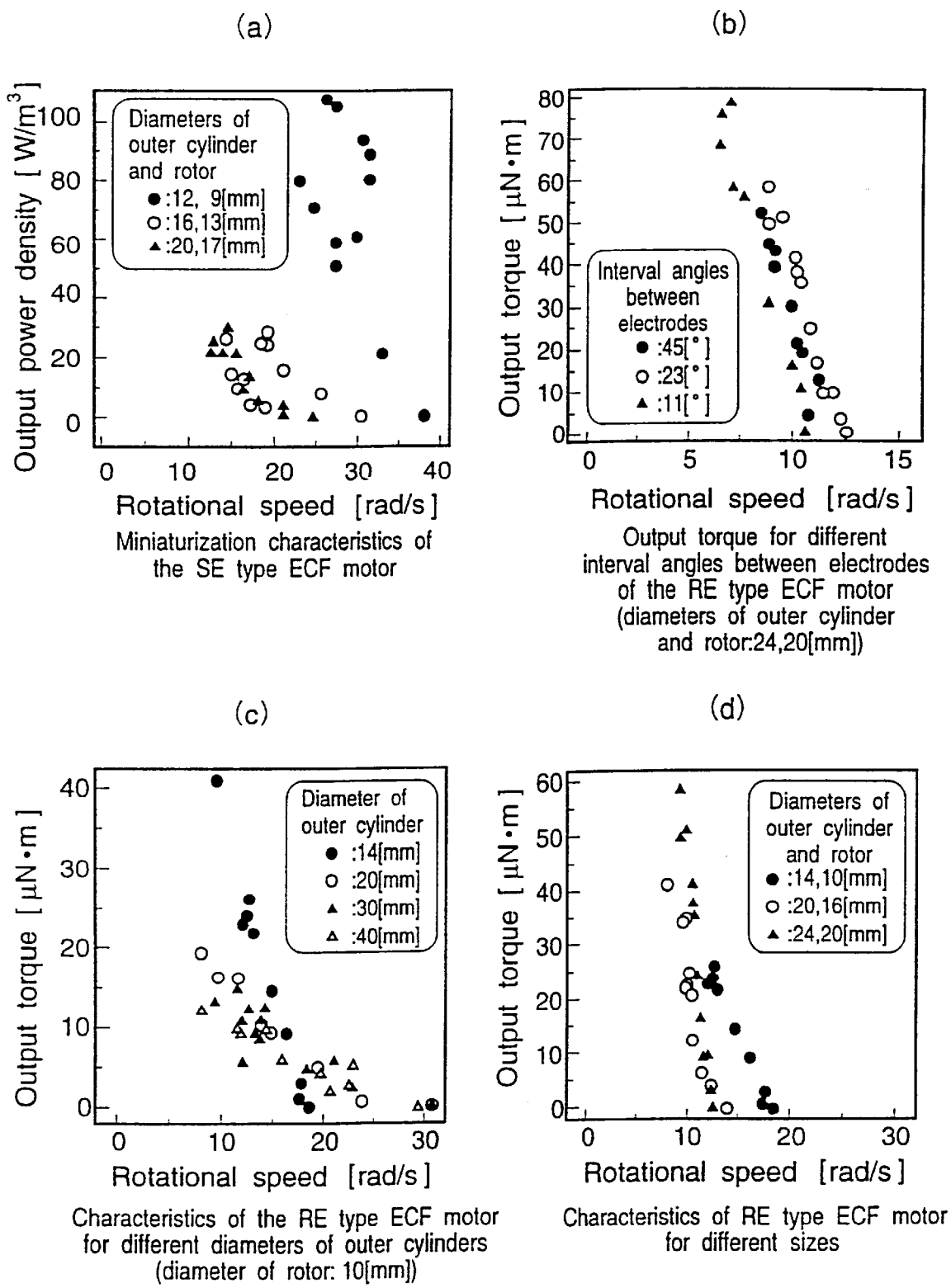

FIG. 8 to FIG. 10 graphically show variability of rotational speed, output torque or motor output power density when dibutyl decanedioate is used as the electro-sensitive movable fluid and the applied voltage, the number of vanes, the diameter of the rotor, the diameter of the fluid container or the number of electrodes is varied.

Figure 11:
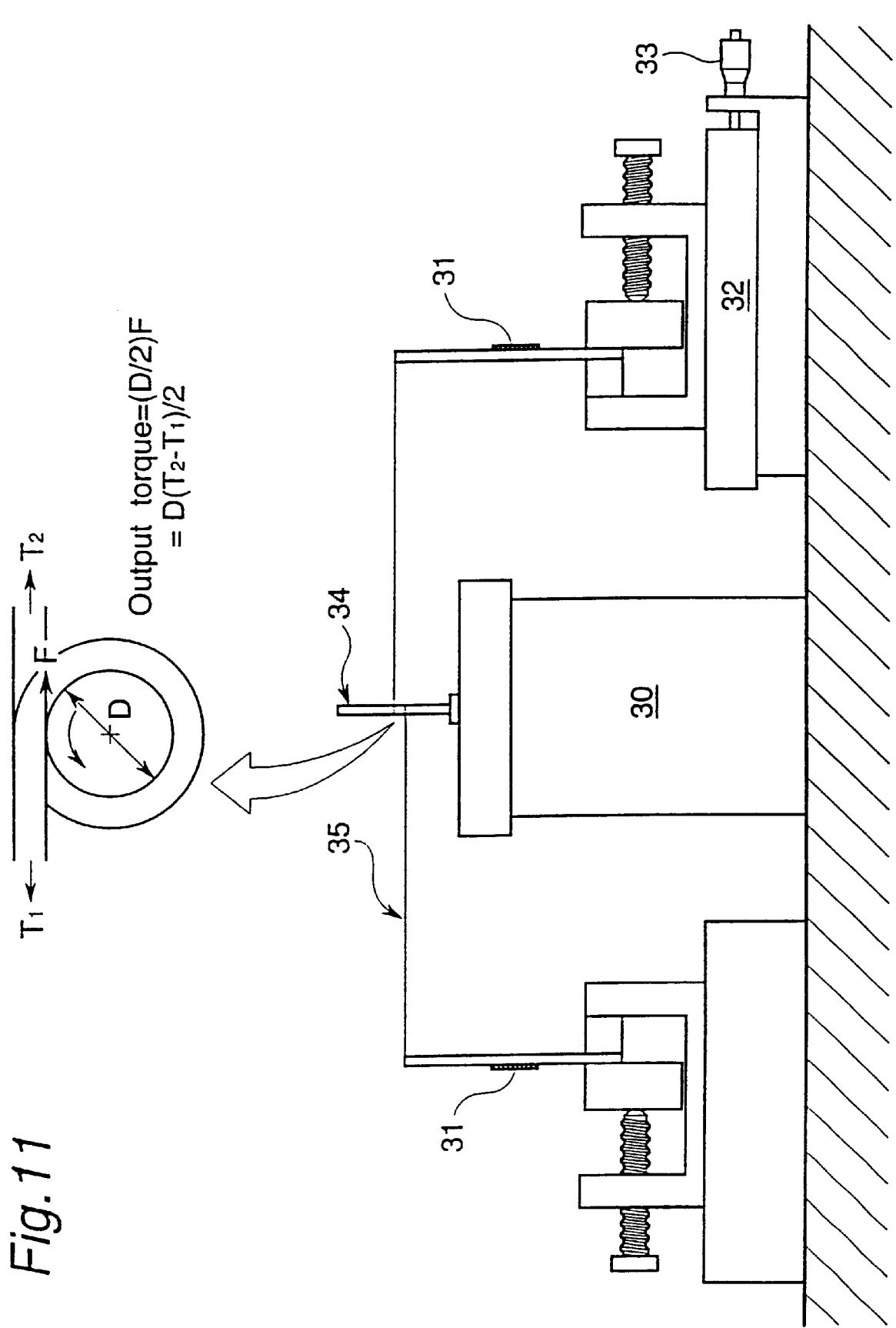

FIG. 11 schematically shows a device which is used in Example 7, etc. to measure output torque.

DETAILED DESCRIPTION OF THE INVENTION

The electro-sensitive movable fluid of the present invention, the method of using the movable fluid, particularly the method of converting electric energy to mechanical energy using the movable fluid, and the motor capable of being driven by the use of the movable fluid are described in detail hereinafter.

Figure 1:
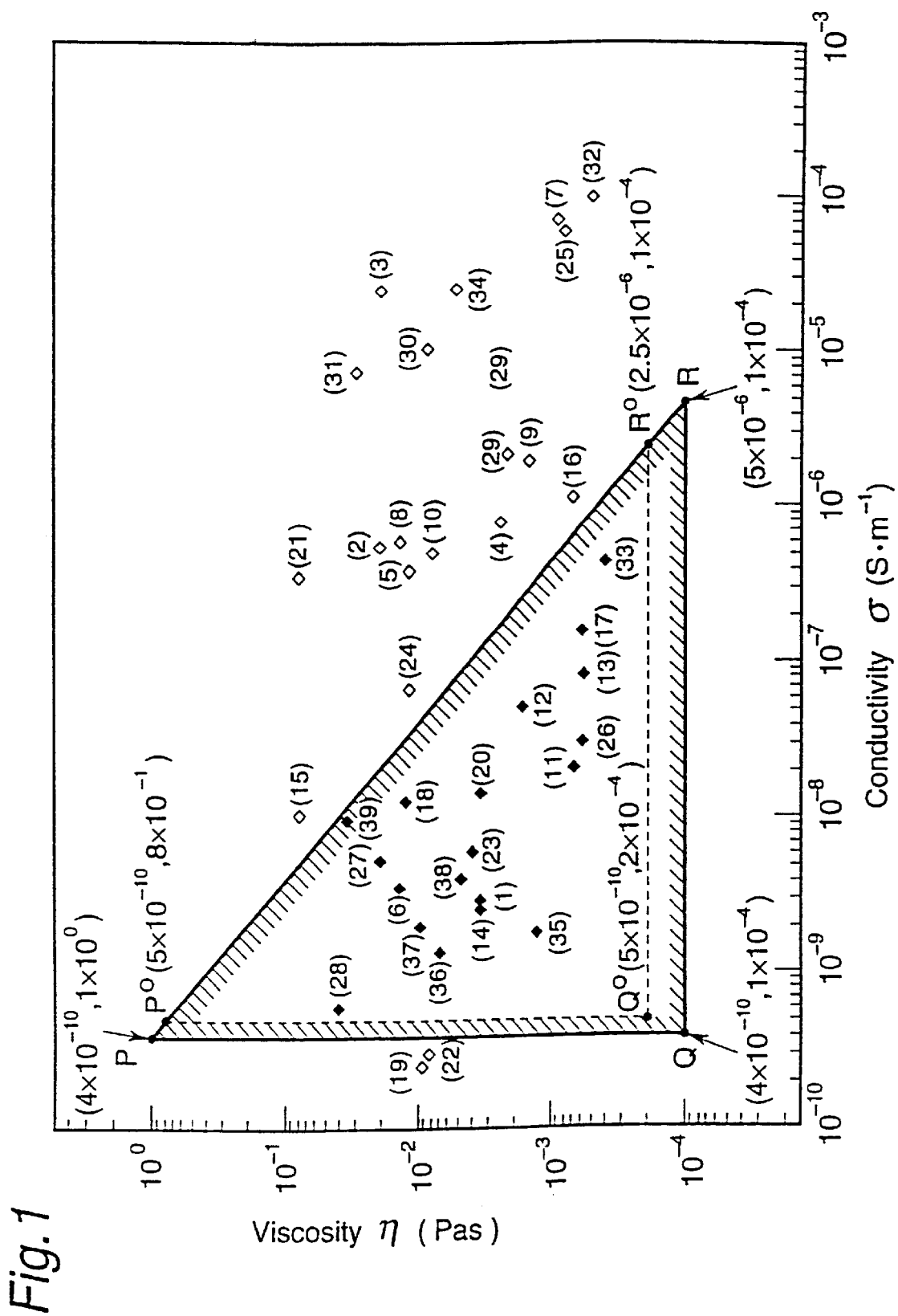
FIG. 1 graphically shows a relation between viscosity and conductivity of the dielectric fluid (electro-sensitive movable fluid).

The electro-sensitive movable fluid of the invention can be specified by the conductivity and the viscosity. When the conductivity σ and the viscosity η of fluids (generally called "dielectric fluids") are measured under the conditions of an electric field intensity of 2 kVmm$^{-1}$ and a temperature of 25° C., the dielectric fluids are distributed as shown in FIG. 1.

Further, when the SE type ECF motor and the RE type ECF motor are driven using the dielectric fluids, these fluids are classified into a group capable of driving those motors and a group incapable of driving those motors. In FIG. 1, the fluids capable of driving the SE type ECF motor and the RE type ECF motor are represented by the symbol ♦, and those incapable of driving the motors are represented by the symbol ◊.

The dielectric fluid serving as the electro-sensitive movable fluid of the invention comprises a compound having, at its working temperature, a conductivity σ and a viscosity η located inside a triangle in a graph (FIG. 1) wherein the conductivity σ is plotted as abscissa and the viscosity η is plotted as ordinate, said triangle having the following points P, Q and R as vertexes, or the fluid comprises a mixture of two or more kinds of compounds, said mixture being adjusted to have a conductivity σ and a viscosity η located inside the above triangle.

TABLE 1

|  | Conductivity (σ) | Viscosity (η) |
|---|---|---|
| Point P (Point P$^0$) | $4 \times 10^{-10}$ S/m preferably $5 \times 10^{-10}$ S/m | $1 \times 10^0$ Pa · S preferably $8 \times 10^{-1}$ Pa · S |
| Point Q (Point Q$^0$) | $4 \times 10^{-10}$ S/m preferably $5 \times 10^{-10}$ S/m | $1 \times 10^{-4}$ Pa · S preferably $2 \times 10^{-4}$ Pa · S |
| Point R (Point R$^0$) | $5 \times 10^{-6}$ S/m preferably $2.5 \times 10^{-6}$ S/m | $1 \times 10^{-4}$ Pa · S preferably $2 \times 10^{-4}$ Pa · S |

In Table 1, the points P$^0$, Q$^0$ and R$^0$ are particularly preferable points as the vertexes of the triangle wherein the electro-sensitive movable fluid of the invention is located.

The electro-sensitive movable fluid of the invention is a substantially dielectric fluid. The conductivity σ of ordinary dielectric fluids, as measured at an electric field intensity of 2 kVmm$^1$ and a temperature of 25° C., is usually in the range of $1 \times 10^{-1}$ S/m to $1 \times 10^{-17}$ S/m. However, the electro-sensitive movable fluid of the invention is a dielectric fluid having a conductivity σ of $4 \times 10^{-10}$ to $5 \times 10^{-6}$ S/m, preferably $5 \times 10^{-10}$ to $2.5 \times 10^{-6}$ S/m. Further, the dielectric fluid employable as the electricity-sensitive working liquid of the invention has a viscosity η of $1 \times 10^{-4}$ Pa·s to $1 \times 10^0$ Pa·s, preferably $2 \times 10^{-4}$ Pa·s to $8 \times 10^{-1}$ Pa·s.

The reason why the electro-sensitive movable fluid of the invention has the above conductivity and viscosity is not clear, but it is assumably as follows.

In the below-described SE type ECF motor and RE type ECF motor, the important factor of controlling the rotary motion is a conductivity of the fluid. Occurrence of the EHD (electrohydrodynamic) motion of the fluid in a direct current field requires presence of free charge. Generation of the free charge results from dissociation of neutral molecule and injection of charge from electrodes. It is thought that free charge is generated when the dielectric fluid having a conductivity within the above range is used as the electro-sensitive movable fluid of the invention and that upon application of a direct-current-voltage, jet flow of the electro-sensitive movable fluid is produced owing to the free charge. It is also thought that the viscosity of the electro-sensitive movable fluid has influence on the efficiency in transference of the kinetic energy of the fluid jet flow to the rotor.

The materials having such conductivity and viscosity include organic ones and inorganic ones. The electro-sensitive movable fluid of the invention may be either of organic and inorganic materials.

Some examples of the organic compounds which have the above properties and are employable as the electro-sensitive movable fluid of the invention are given below.

(1) Dibutyl adipate (DBA)

(σ=3.01×10$^{-9}$ S/m, η=3.5×10$^{-3}$ Pa·s)

(6) Triacetin (σ=3.64×10$^{-9}$ S/m, η=1.4×10$^{-2}$ Pa·s)

CH$_2$OCOCH$_3$
|
CHOCOCH$_3$
|
CH$_2$OCOCH$_3$

(11) Butyl cellosolve acetate (σ=2.10×10$^{-8}$ S/m, η=7.0×10$^{-4}$ Pa·s)

(12) Butyl carbitol acetate (σ=5.20×10$^{-8}$ S/m, η=1.7×10$^{-3}$ Pa·s)

(13) 3-Methoxy-3-methylbutyl acetate (Solfit AC)

(σ=8.30×10$^{-8}$ S/m, η=6.0×10$^{-4}$ Pa·s)

(14) Dibutyl fumarate (DBF)

(σ=2.65×10$^{-9}$ S/m, η=3.5×10$^{-3}$ Pa·s)

(17) Propylene glycol methyl ether acetate (PMA)

(σ=1.56×10$^{-7}$ S/m, η=6.0×10$^{-4}$ Pa·s)

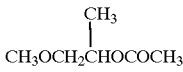

(18) Methyl acetyl ricinoleate (MAR-N)

(σ=1.30×10$^{-8}$ S/m, η=1.3×10$^{-2}$ Pa·s)

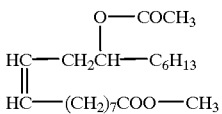

(20) Dibutyl itaconate (DBI)

(σ=1.46×10$^{-8}$ S/m, η=3.5×10$^{-3}$ Pa·s)

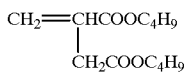

(23) 2,2,4-Trimethyl-1,3-pentanediol diisobutyrate (trade name: Kyowanol D)

($\sigma=6.24\times10^{-9}$ S/m, $\eta=4.0\times10^{-3}$ Pa·s)

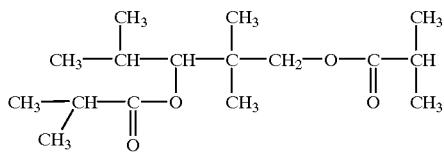

(26) Propylene glycol ethyl ether acetate (trade name: BP-Ethoxypropyl Acetate)

($\sigma=3.10\times10^{-8}$ S/m, $\eta=6.0\times10^{-4}$ Pa·s)

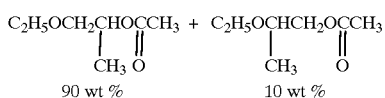

(27) 9,10-Epoxy butyl stearate (trade name: Sansocizer E-4030)

($\sigma=5.46\times10^{-9}$ S/m, $\eta=2.0\times10^{-2}$ Pa·s)

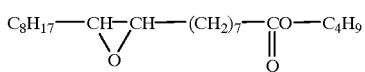

(28) Tetrahydrophthalic acid dioctyl ether (trade name: Sansocizer DOTP)

($\sigma=6.20\times10^{-10}$ S/m, $\eta=4.0\times10^{-2}$ Pa·s)

(33) 1-Ethoxy-2-acetoxypropane ($\sigma=4.41\times10^{-7}$ S/m, $\eta=4.0\times10^{-4}$ Pa·s)

(35) Linalyl acetate ($\sigma=1.82\times10^{-9}$ S/m, $\eta=1.3\times10^{-3}$ Pa·s)

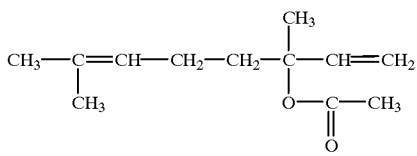

(36) Dibutyl decanedioate ($\sigma=1.35\times10^{-9}$ S/m, $\eta=7.0\times10^{-3}$ Pa·s)

When a combination of plural compounds is used as the electro-sensitive movable fluid of the invention, the conductivity and the viscosity of a mixture of the plural compounds can be made to be located inside the triangle defined by the points P, Q and R shown in FIG. 1.

In other words, even if each of compounds has a conductivity and/or a viscosity out of the above range, a mixture of the compounds is employable as the electro-sensitive movable fluid of the invention, as far as the conductivity and the viscosity of the mixture are within the above range, respectively.

For example, a mixture (37) ($\sigma=2.60\times10^{-9}$ S/m, $\eta=9.8\times10^{-3}$ Pa·s) of 2,2,4-trimethyl-1,3-pentanediol monoisobutyrate (trade name: Kyowanol M, $\sigma=6.80\times10^{-8}$ S/m, $\eta=1.2\times10^{-2}$ Pa·s) and 2-ethylhexyl palmitate (trade name: Exepal EH-P, $\sigma=2.60\times10^{-10}$ S/m, $\eta=9.5\times10^{-3}$ Pa·s) in a mixing ratio of 1:4 by weight, each having a conductivity and a viscosity out of the above range, is employable as the electro-sensitive movable fluid. Also, a mixture (38) ($\sigma=4.17\times10^{-9}$ S/m, $\eta=5.0\times10^{-3}$ Pa·s) of DAM (diallyl maleate, $\sigma=7.8\times10^{-7}$ S/m, $\eta=2.5\times10^{-3}$ Pa·s) and butyl stearate (trade name: Exepal BS, $\sigma=3.1\times10^{-10}$ S/m, $\eta=8.5\times10^{-3}$ Pa·s) in a mixing ratio of 1:4 by weight, each having a conductivity and a viscosity out of the above range, is employable as the electro-sensitive movable fluid.

The requisite of the electro-sensitive movable fluid of the invention is that the movable fluid has the above-defined conductivity and viscosity. The conductivity and viscosity mentioned above are measured at room temperature, but these property values are known to vary depending on the measuring temperature. The conductivity and the viscosity defined in the invention are irrespective of the temperature. That is, even the compounds having a conductivity and a viscosity out of the above range at room temperature (25° C.) are employable as the electro-sensitive movable fluids, as far as the conductivity and the viscosity of the compounds are within the above range at their working temperatures, e.g., high temperatures or low temperatures. For example, the compound (15), 2-ethylhexyl benzyl phthalate (trade name: Placizer B-8), has a conductivity $\sigma$ of $1.10\times10^{-8}$ S/m and a viscosity $\eta$ of $7.8\times10^{-2}$ Pa·s at room temperature, and even if a direct-current-voltage of 6 kV is applied to the compound at 25° C., the SE type ECF motor or the RE type ECF motor with the compound (25) cannot be driven. To the contrary, a heated product (39) obtained by heating 2-ethylhexyl benzyl phthalate at 100° C., has a conductivity $\sigma$ of $9.90\times10^{-9}$ S/m and a viscosity $\eta$ of $3.5\times10^{-2}$ Pa·s (at 100° C.), and therefore the SE type ECF motor or the RE type ECF motor with the heated product (39) can be driven by applying a direct-current-voltage of 6 kV to the product (39).

On the other hand, at room temperature (25° C.), none of the below-described compounds have a conductivity $\sigma$ and a viscosity $\eta$ located inside the triangle formed by the points P, Q and R in FIG. 1. Therefore, those compounds cannot drive the SE type ECF motor or the RE type ECF motor at 25° C. when they are used singly.

(2) Tributyl citrate (TBC)

($\sigma=5.71\times10^{-7}$ S/m, $\eta=2.0\times10^{-2}$ Pa·s)

(3) Monobutyl maleate (MBM)

($\sigma=2.60\times10^{-5}$ S/m, $\eta=2.0\times10^{-2}$ Pa·s)

(4) Diallyl maleate (DAM)

($\sigma=7.80\times10^{-7}$ S/m, $\eta=2.5\times10^{-3}$ Pa·s)

(5) Dimethyl phthalate (DMP)

($\sigma=3.90\times10^{-7}$ S/m, $\eta=1.2\times10^{-2}$ Pa·s)

(7) Ethyl cellosolve acetate ($\sigma=7.30\times10^{-5}$ S/m, $\eta=9.0\times10^{-4}$ Pa·s)

(8) 2-(2-Ethoxyethoxy)ethyl acetate ($\sigma$=6.24×10$^{-7}$ S/m, $\eta$=1.4×10$^{-2}$ Pa·s)

(9) 1,2-Diacetoxyethane ($\sigma$=2.00×10$^{-6}$ S/m, $\eta$=1.5×10$^{-3}$ Pa·s)

(10) Triethylene glycol diacetate ($\sigma$=5.20×10$^{-7}$ S/m, $\eta$=8.1×10$^{-3}$ Pa·s)

2-Ethylhexyl benzyl phthalate
(19) 2-Ethylhexyl palmitate (trade name: Exepal EH-P)

($\sigma$=2.60×10$^{-10}$ S/m, $\eta$=9.5×10$^{-3}$ Pa·s)

(21) Polyethylene glycol monooleate (trade name: Emanone 4110)

($\sigma$=3.75×10$^{-7}$ S/m, $\eta$=8.0×10$^{-2}$ Pa·s)

(22) Butyl stearate (trade name: Exepal BS)

($\sigma$=3.10×10$^{-10}$ S/m, $\eta$=8.5×10$^{-3}$ Pa·s)

(24) 2,2,4-trimethyl-1,3-pentanediol monoisobutyrate (trade name: Kyowanol M)

($\sigma$=6.80×10$^{-8}$ S/m, $\eta$=1.2×10$^{-2}$ Pa·s)

(25) Propylene glycol monoethyl ether ($\sigma$=6.24×10$^{-5}$ S/m, $\eta$=8.0'10$^{-4}$ Pa·s)

(29) Tributyl phosphate (TBP)

($\sigma$=2.20×10$^{-6}$ S/m, $\eta$=2.2×10$^{-3}$ Pa·s)

(30) Tributoxyethyl phosphate (TBXP)

($\sigma$=1.10×10$^{-5}$ S/m, $\eta$=9.0×10$^{-3}$ Pa·s

(31) Tris(chloroethyl) phosphate (CLP)

($\sigma$=7.80×10$^{-6}$ S/m, $\eta$=3.0×10$^{-2}$ Pa·s)

(32) Ethyl 2-methylacetoacetate ($\sigma$=1.00×10$^{-4}$ S/m, $\eta$=5.0×10$^{-4}$ Pa·s)

(34) 2-(2,2-Dichlorovinyl)-3,3-dimethylcyclopropane carboxylic acid methyl ester (DCM-40)

($\sigma$=2.60×10$^{-5}$ S/m, $\eta$=5.5×10$^{-3}$ Pa·s)

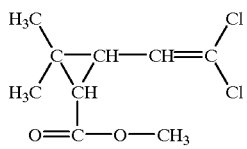

The electro-sensitive movable fluid of the invention, which is identified by the conductivity $\sigma$ and the viscosity $\eta$ as described above and is an organic material, preferably has the following structure.

That is, the electro-sensitive movable fluid of the invention preferably comprises a chain or branched, substantially dielectric fluid compound containing molecular end group composed of alkyl groups, outer ends of said groups inactivated by hydrogen atoms bonding to the carbon atoms, said molecular end groups being united by bonding to each other at the inner ends, in which the bonding hand of each carbon atom for constituting the end groups with the sealed ends is bonded to at least one hetero atom and further linked to a straight-chain divalent hydrocarbon group, which may have a hetero atom and may have a branch, through the hetero atom, or is bonded to a divalent hydrocarbon group which may have a hetero atom or may have a branch.

The electro-sensitive movable fluid having the above structure is preferably at least one compound selected from the compounds represented by the following formulas [I], [II], [III], [IV] and [V].

The compound represented by the following formula [I] is employable as the electro-sensitive movable fluid of the invention.

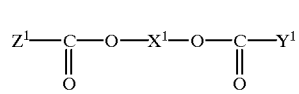

[I]

In the formula [I], $X^1$ is a divalent group of 1 to 14 carbon atoms. This divalent group may be a straight-chain group or a branched group. Further, $X^1$ may be a hydrocarbon group composed of a carbon atom and a hydrogen atom, and it may further have hetero atoms (atoms other than carbon atom and hydrogen atom), such as an oxygen atom, a nitrogen atom and a sulfur atom. Of such divalent groups, those having an oxygen atom are, for example, groups having an ether linkage or groups having an ester linkage.

Examples of the straight-chain groups among the divalent groups of 1 to 14 carbon atoms include —$CH_2$—, —$CH_2CH_2$—, —$CH_2CH_2CH_2$—, —$CH_2CH_2CH_2CH_2$— and —$(CH_2)_n$— (n is an integer of 5 to 14).

The branched hydrocarbon group is a divalent group having usually 3 to 14 carbon atoms, preferably 4 to 14 carbon atoms, and some examples thereof are given below.

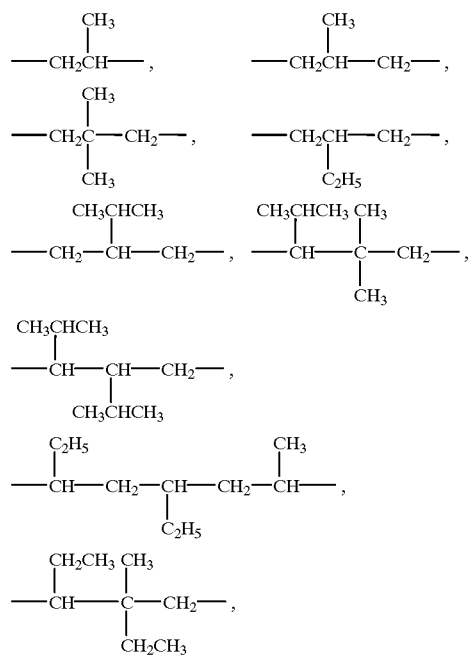

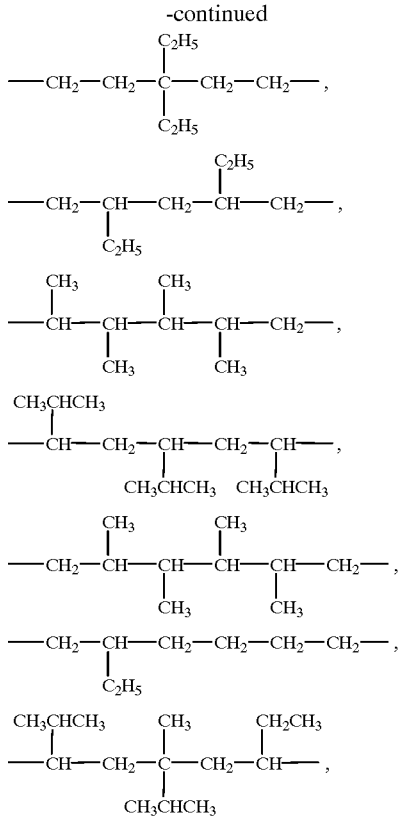

In the formula [I], when $X^1$ is a divalent group having an oxygen atom, examples of the divalent groups having an ether linkage include the following groups.

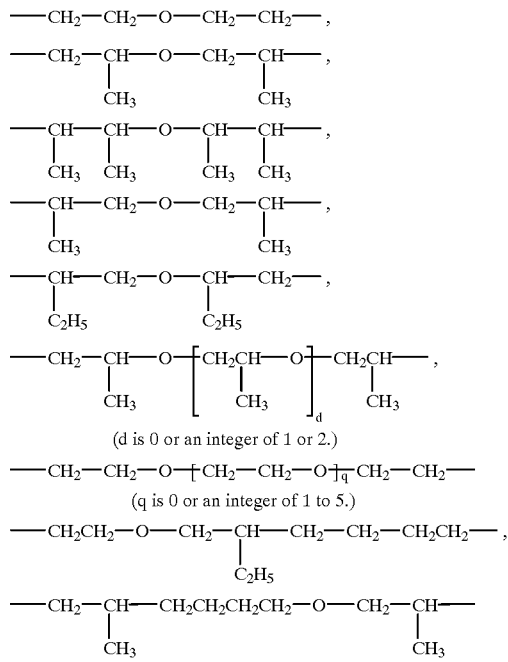

In the formula [I], when $X^1$ is a divalent group having an oxygen atom, examples of the divalent groups having an ester linkage include the following groups.

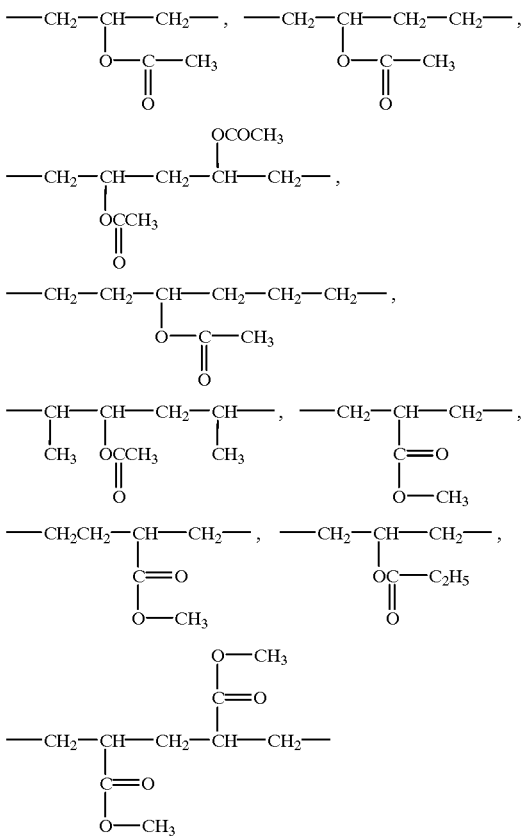

In the formula [I], $Y_1$ and $Z^1$ are each independently an alkyl group of 1 to 5 carbon atoms, and examples thereof include methyl, ethyl, n-propyl, iso-propyl, n-butyl, iso-butyl, tert-butyl, n-pentyl and iso-pentyl. Each of $Y^1$ and $Z^1$ may be a straight-chain alkyl group or a branched alkyl group. $Y^1$ and $Z^1$ may be the same as or different from each other.

Listed below are some examples of the compounds represented by the formula [I] wherein $X^1$, $Y^1$ and $Z^1$ are such groups as mentioned above, which are suitably used as the electro-sensitive movable fluid. 2,2,4-Trimethyl-1,3-pentanediol diisobutyrate

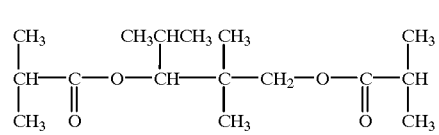

Glycerol triacetate

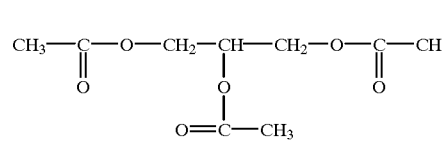

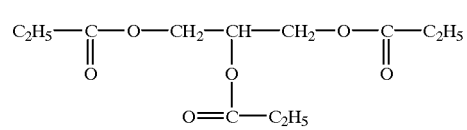

[I-4]

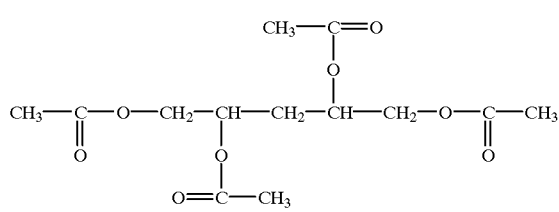

[I-5]

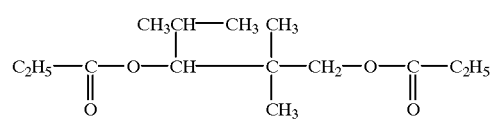

[I-6]

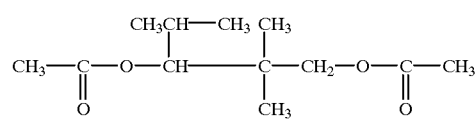

[I-7]

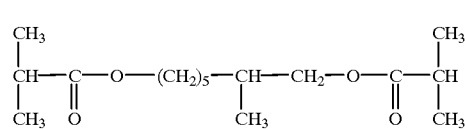

The compound represented by the following formula [II] is employable as the electro-sensitive movable fluid of the invention.

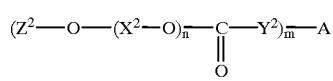

[II]

In the formula [II], $X^2$ is a divalent hydrocarbon group of 2 to 9 carbon atoms, preferably 2 to 5 carbon atoms, which may have a branch. $Y^2$ is a divalent alkyl group of 1 to 6 carbon atoms which may have a branch. Some examples of such alkyl groups are given below.

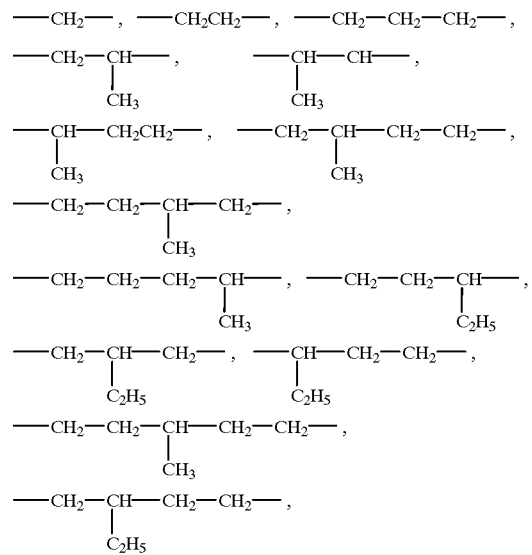

In the formula [II], $Z^2$ is an alkyl group of 1 to 6 carbon atoms which may have a branch. Some examples of such alkyl groups are given below.

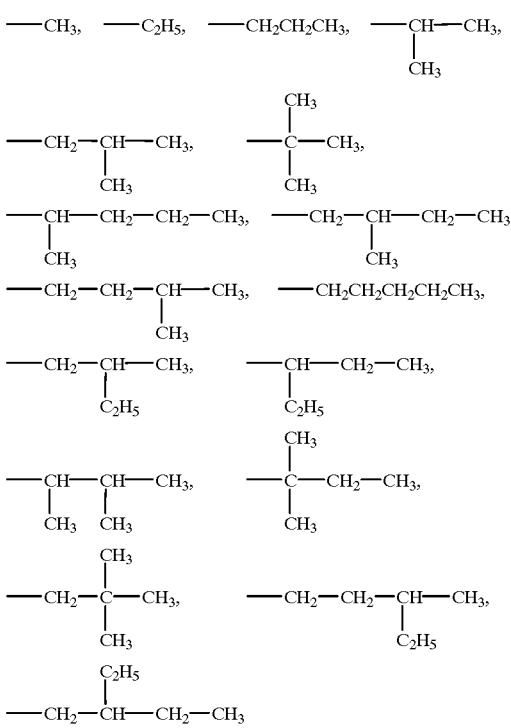

In the formula [II], n is an integer of 1 to 4, preferably an integer of 1 to 3, more preferably an integer of 1 or 2.

m is an integer of 1 or 2. When m is 1, A is a hydrogen atom. When m is 2, the compound of the formula [II] is a symmetric dimer having A as a bonding hand wherein groups which are each represented by $(Z^2-O-(X^2-O-)_n-CO-Y^2)-$ are directly bonded to each other.

Listed below are examples of the compounds represented by the formula [II].

[II-1]

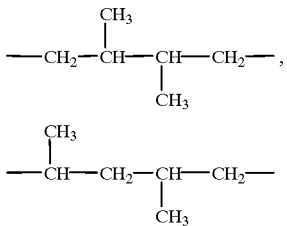

[II-2]

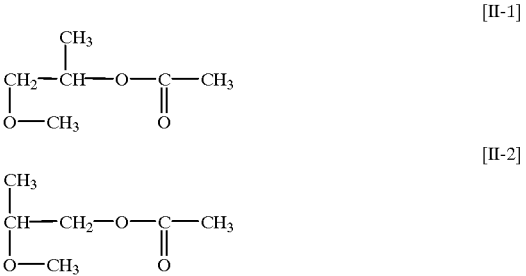

-continued

[II-3] 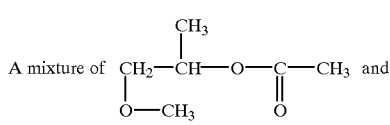

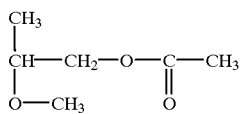

[II-4] 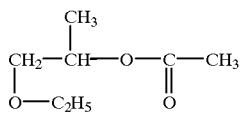

[II-5] 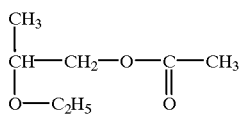

[II-6] 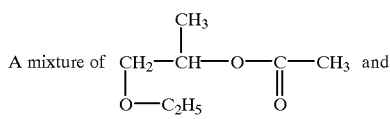

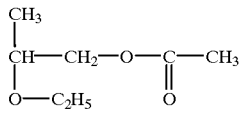

[II-7] 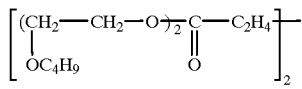

[II-8] 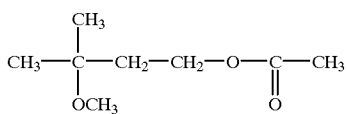

[II-9] 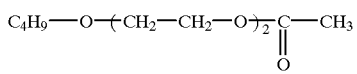

[II-10] 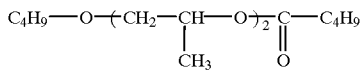

[II-11] 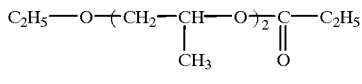

[II-12] 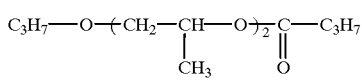

[II-13] 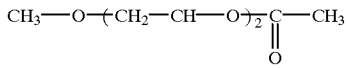

[II-14] 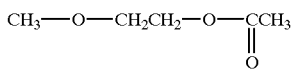

The compound represented by the following formula [III] is employable as the electro-sensitive movable fluid of the invention.

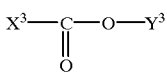

[III]

In the formula [III], $X^3$ is a monovalent group having carbon atoms (a), oxygen atoms (b) and hydrogen atoms (2a+1−2b) wherein a is an integer of 1 to 25, b is 0, 1, 2 or 3, and a and b are numbers satisfying the condition of 2a+1>2b, preferably a monovalent group which may have one oxygen atom as an epoxy group or a carbonyl group and has 1 to 17 carbon atoms. $Y^3$ is a hydrocarbon group of 1 to 14 carbon atoms which may have a branched chain and/or a carbon-to-carbon double bond, preferably a hydrocarbon group of 2 to 10 carbon atoms.

Listed below are examples of the compounds represented by the formula [III].

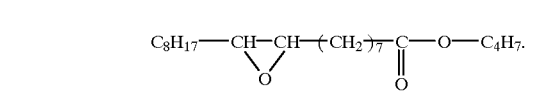

[III-1] 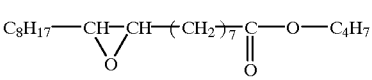

[III-2] 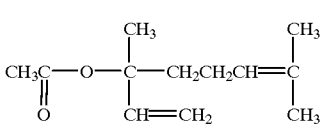

[III-3] 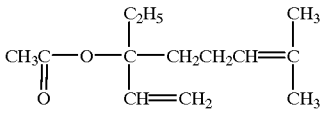

[III-4] 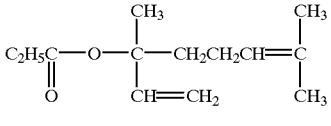

[III-5] 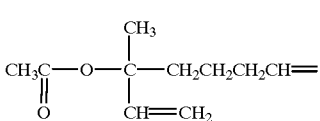

[III-6] 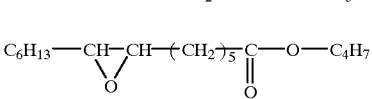

[III-7] 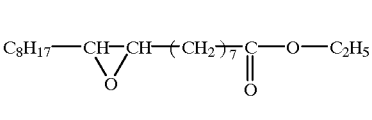

[III-8] 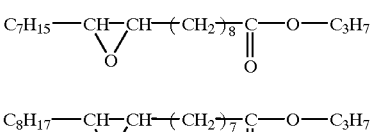

[III-9]

-continued

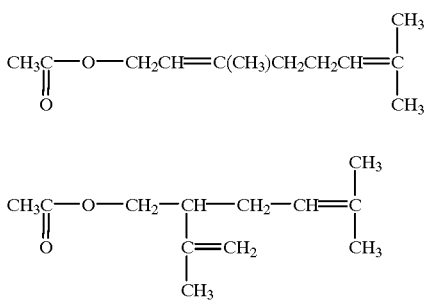
[III-10]

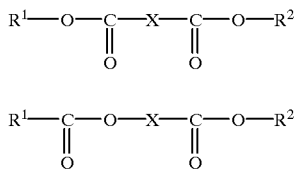
[III-11]

The compound represented by the following formula [IV] or [V] is employable as the electro-sensitive movable fluid of the invention.

$$R^1-O-\underset{\underset{O}{\|}}{C}-X-\underset{\underset{O}{\|}}{C}-O-R^2 \qquad [IV]$$

$$R^1-\underset{\underset{O}{\|}}{C}-O-X-\underset{\underset{O}{\|}}{C}-O-R^2 \qquad [V]$$

In the formulas [IV] and [V], $R^1$ and $R^2$ are each independently a hydrocarbon group of usually 1 to 15 carbon atoms, preferably 1 to 9 carbon atoms, but they may be each independently a hydrocarbon group having an atom other than carbon and hydrogen. $R^1$ and $R^2$ may be the same as or different from each other.

In the formulas [IV] and [V], X is a divalent group represented by the following formula [VI] or [VII].

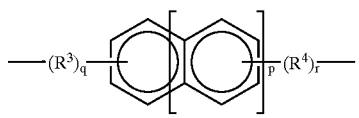
[VI]

In the formula [VI], $R^3$ and $R^4$ are each basically a divalent hydrocarbon group of usually 1 to 5 carbon atoms, preferably 1 to 2 carbon atoms. This hydrocarbon group may have a branch, and to the hydrocarbon group, an atom other than carbon and hydrogen may be bonded. $R^3$ and $R^4$ may be the same as or different from each other.

In the formula [VI], q and r are each independently 0 or an integer of 1 or more, and when q or r is 0, $R^3$ and $R^4$ are each independently a single bond.

In the formula [VI], p is 0 or an integer of 1, 2 or 3. The cyclic structure regulated by p may have a substituent, and the cyclic structure may be partly or wholly hydrogenated.

$$-C_nH_{(2n-2m)}- \qquad [VII]$$

In the formula [VII], n is an integer of 2 or more, and m is the number of double bonds contained in this group. That is, the group represented by the formula [VII] has a double bond.

Listed below are examples of the compounds represented by the formula [IV] or [V].

Dialkyl itaconates
e.g., Dibutyl itaconate, e.g., Diethyl itaconate

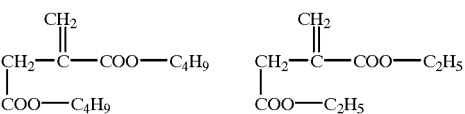

Alkyl acetyl ricinoleates
e.g., Methyl acetyl ricinoleate

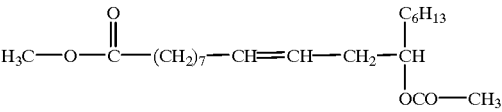

Dialkyl fumarates
e.g., Dibutyl fumarate

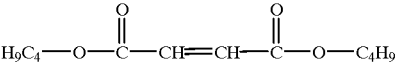

e.g., Bis(2-ethylhexyl)fumarate

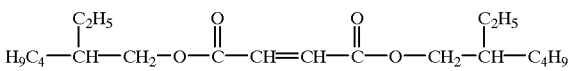

Dialkyl adipates
e.g., dibutyl adipate

e.g., Bis(2-ethylhexyl)adipate

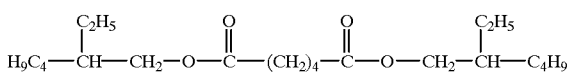

Dialkyl azelates
e.g., Bis(2-ethylhexyl)azelate

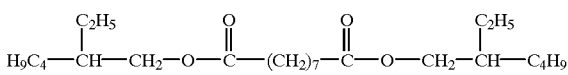

e.g., Dibutyl azelate

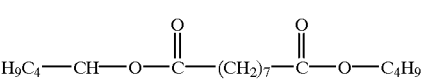

Phthalic acid derivatives
e.g., Butyl benzyl phthalate

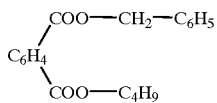

Dialkyl phthalates
e.g., Bis(n-octyl)phthalate

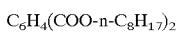

Dialkyl decanedioates
e.g., Dibutyl decanedioate

e.g., Bis(2-ethylhexyl)decanedioate

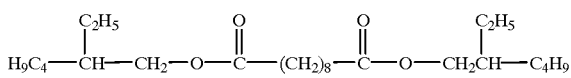

Dialkyl naphthenates
e.g., Dibutyl naphthenate

Of the compounds represented by the formulas [I] to [V], the compound employable as the electro-sensitive movable fluid of the invention needs to have a conductivity σ and a viscosity η, at its working temperature, located is inside the triangle formed by the points P, Q and R in the graph shown in FIG. 1. When the electro-sensitive movable fluid is an organic compound, the compound preferably has a structure represented by the formula [I], [II] or [III].

The compounds serving as the electro-sensitive movable fluids can be synthesized by combining known synthesizing methods. Some compounds having the above structures are commercially available. As a matter of course, not only the compounds prepared by the known synthesizing methods but also the commercially available compounds can be used as the electro-sensitive movable fluid of the invention. These compounds can be used after purified, if desired.

To the above-mentioned compounds, a small amount of hydrocarbon compounds having 5 to 10 carbon atoms can be added to give mixtures employable as the electro-sensitive movable fluids of the invention. When the mixture containing a small amount of a hydrocarbon compound of 5 to carbon atoms is used as the electro-sensitive movable fluid, the electric sensitivity of the movable fluid can be improved.

Examples of the hydrocarbon compounds of 5 to 10 carbon atoms include petroleum benzine, ligroin, hexane, pentane, cyclopentane, cyclohexane and benzene. It is particularly preferable to use petroleum benzine and ligroin singly or in combination. The petroleum benzine is defined by JIS K 8594 and is a hydrocarbon fraction of 5 to 8 carbon atoms having a distillation temperature of 50 to 80° C. The ligroin is defined by JIS K 8937 and is a hydrocarbon fraction of 5 to 9 carbon atoms having a distillation temperature of 80 to 110° C.

The hydrocarbon compound of 5 to 10 carbon atoms is added to the electro-sensitive movable fluid in an amount of usually 0.1 to 20% by weight, preferably 1 to 10% by weight. However, mixing of those compounds may cause decrease of the specific gravity of the electro-sensitive movable fluid or increase of the current value, so that the mixing ratio can be adjusted according to the use purpose. The total amount of the hydrocarbon compound of 5 to 10 carbon atoms and the compound exhibiting electric sensitivity is 100% by weight.

To the electro-sensitive movable fluid of the invention, various additives, such as metallic powders, substances to ascertain stability of the movable fluid, colorants for color development (e.g., dyes and pigments), viscosity modifiers to modify viscosity of the movable fluid, can be added. Further, biocides agents, mildewcides, solvents, etc. can be also added.

When a direct-current-voltage is applied to the electro-sensitive movable fluid of the invention, jet flow of the movable fluid corresponding to the applied direct-current-voltage is formed.

For example, when the electro-sensitive movable fluid of the invention having a conductivity and a viscosity located inside the triangle formed by the points P, Q and R in FIG. 1, preferably having a structure represented by the above formula, is introduced in a container provided with electrodes shown in FIG. 5 and a direct-current-voltage is applied, such jet flows of the electro-sensitive movable fluid as shown in FIG. 5 are produced. Therefore, if a vane rotor is equipped in the container, convection of the electro-sensitive movable fluid collides with vanes of the rotor to thereby rotate the rotor. That is, the electric energy supplied to the electro-sensitive movable fluid of the invention is converted to kinetic energy of fluid (i.e., jet flow of the movable fluid), and the kinetic energy is captured and taken out. Thus, the electric energy can be transformed to mechanical energy through the electro-sensitive movable fluid.

The electro-sensitive movable fluid of the invention can be used for fluid control device (fluidics). The fluidics have a function to convert an electric-signal to a fluid-signal, so that they can be applied to, as it is called, fluid-computer.. In the fluidics using the electro-sensitive movable fluid of the invention, as shown in FIG. 6(A), electrodes 65, 66, 67 are arranged in a main tube 61 of a fluid transport tube having plural branch tubes 62a, 62b, - - - . Of the electrodes, the electrode 65 is grounded to make it a negative electrode, while the electrode 66 is set to be a positive electrode. Then, a voltage is applied to the positive electrode. If a jet flow of the electro-sensitive movable fluid is given in the upward direction inside the main tube 61, a force to move the electro-sensitive movable fluid in the direction of the electrode 66 to the electrode 65 is generated. This force acts to push the upward jet flow in the transverse direction, whereby the jet flow is led to the branch tube 62b. To the contrary, when the electrode 67 is set to be a positive electrode and a voltage is applied thereto, the jet flow can be led to the branch tube 62a. Thus, the electric signals between the electrodes can be converted to the kinetic signals of fluid.

As shown in FIG. 6(B), if the positions of the electrodes in the fluidics are varied so that the electrode 69 is set to be a positive electrode and that change-over of the negative electrode (ground point) between the electrode 68a and the electrode 68b is made possible, a jet flow of the electro-sensitive movable fluid is formed and the direction of the jet flow can be controlled by performing change-over of the earth point (68a, 68b). Thus, the electric signals between the electrodes can be converted to the kinetic signals of fluid.

Figure 3:
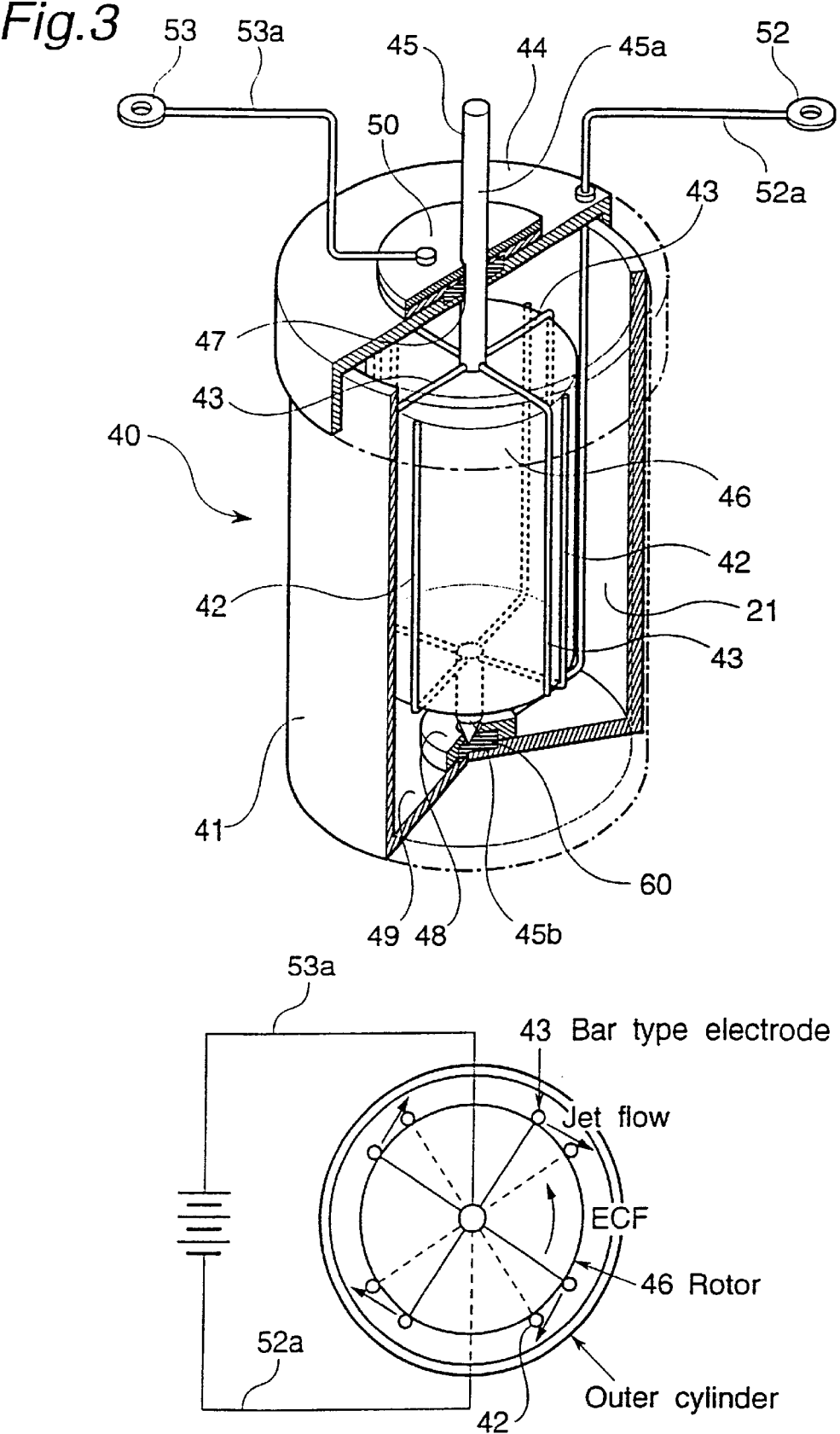
FIG. 3 schematically shows an embodiment of the RE type ECF motor using the electro-sensitive movable fluid and an embodiment of arrangement of the electrodes.

In FIG. 2, an embodiment of an apparatus (SE type ECF motor) to convert the electric energy to the mechanical energy using the electro-sensitive movable fluid is shown, and an embodiment of arrangement of the electrodes in the SE type ECF motor is also shown. In FIG. 3, an embodiment of a RE type ECF motor and an embodiment of arrangement of the electrodes in the RE type ECF motor are shown.

Referring to FIG. 2, the SE type ECF motor 1 comprises a container 2 (bottomed cylindrical fluid container) to be filled with an electro-sensitive movable fluid 22, a lid 4 of the fluid container 2, and a vane rotor 18 provided with vanes 6 which detect motion of the movable fluid 22 caused by application of a voltage to rotate the rotor. The upper rim of the bottomed cylindrical fluid container 2 is provided with slits 13 for disposing electrodes 3a - - - 3h therein. In the fluid container 2, fixing parts 14, 15 are provided to fix the electrodes 3a - - - 3h drawn inside through the slits onto the inner wall surface of the fluid container.

The center of the lid 4 is provided with a shaft hole 19 through which a rotating shaft of the vane rotor 18 penetrates. The vane rotor 18 comprises a bearing 23 provided at the center of the bottom of the fluid container and plural vanes 6 combined with the rotating shaft which is rotatably borne by the shaft hole.

The electrodes 3a - - - 3h are drawn inside the fluid container 2 through the slits 13 and extend toward the bottom of the fluid container 2 along the inner wall surface of the fluid container 2 so that the rotation of the vane rotor 18 is not hindered. The electrodes 3a - - - 3h are insulated from each other.

The electro-sensitive movable fluid 22 is filled in fluid container 2 in such an amount that the movable fluid does not overflow the slits 13 and that most parts of the vanes 6 are immersed in the movable fluid. Then, a direct-current-voltage is applied to the electrodes 3a - - - 3h. The rotational direction of the vane rotor 18 can be controlled by the arrangement of positive electrodes and negative electrodes.

For example, when the electrodes 3a, 3e are set to be positive electrodes, the electrodes 3b, 3f are set to be negative electrodes, and the electrodes 3c, 3d, 3g and 3h are set to be dummy electrodes, a jet flow in the direction of the electrode 3a to the electrode 3b or a jet flow in the direction of the electrode 3e to the electrode 3f dominates. Consequently, the rotational direction of the vane rotor 18 can be made clockwise as shown by arrows in FIG. 2.

The voltage and the current applied to n of the electrodes represented by 3a to 3h—can be successively varied with time (variable application method). In the variable application method, the applied voltage can be made low. Hence, this method is very useful in the case where a high voltage is unable to be used or a large-sized apparatus needs to be used.

The motor in which the electrodes 3a - - - 3h are fixed to the inner wall surface of the fluid container 2 is referred to herein as "SE type ECF motor (stator-electrode type electro-conjugate fluid motor)".

For example, a vane rotor 18 having eight vanes 6 is disposed inside the cylindrical fluid container 2, and the fluid container 2 is filled with the electro-sensitive movable fluid to fabricate a SE type ECF motor shown in FIG. 2. When a direct-current-voltage is applied between the electrodes 3a - - - 3h arranged shown in FIG. 2, the vane rotor 18 begins to rotate. As the number of the vanes 6 is increased, the rotational speed of the vane rotor 18 tends to be increased. As the interval of the electrodes is narrowed, or as the number of pairs of the electrodes is increased, the rotational speed tends to be increased. The rotational speed of the vane rotor 18 is increased or decreased in proportion to the applied voltage during the time from the initial rotation to the stable rotation.

The electro-sensitive movable fluid of the invention is able to convert the electric energy to the mechanical energy using the below-described RE type ECF motor in place of the SE type ECF motor.

FIG. 3 is a perspective view schematically showing another embodiment (RE type ECF motor) of the motor using the electro-sensitive movable fluid. In FIG. 3, an embodiment of arrangement of the electrodes in the RE type ECF motor is also shown.

Referring to FIG. 3, the motor (RE type ECF motor) 40 for electro-sensitive movable fluid comprises a container 41 (bottomed fluid container) to be filled with an electro-sensitive movable fluid 22 and a lid 44 which is engaged with the open top to close the fluid container 41. When the lid 44 is engaged with the upper open part of the fluid container 41, the lid 44 and the fluid container 41 construct together a closed housing.

The fluid container 41 for constituting the house has a bottom and is generally made of a material which is corrosion resistant to the electro-sensitive movable fluid filled therein. Examples of such material include synthetic resins, such as Teflon®, polycarbonate and acrylic resins, ceramics, woods, metals and glasses. The fluid container 41 can be formed from a conductive material such as metal (e.g., stainless steel). The fluid container 41 formed from such conductive material is preferably subjected to electrical insulation treatment or the fluid container 41 is preferably formed from an insulating material so as not to mar the insulated state between the electrodes.

The center of the bottom 49 of the fluid container 41 is provided with a bearing section 48. Owing to the bearing section 48, the lower end of a rotating shaft 45 is borne. The bearing section 48 forms a rotational contact point 60 for electrically connecting the second external terminals 52 and the second electrodes 42 with each other. From the rotational contact point 60, conductors are led out along the inner wall surface of the fluid container 41. The conductors led out of the housing form the second external terminals 52. At the bearing section 48 which forms the rotational contact point 60 and bear the lower end of a rotating shaft 45, a bearing mechanism can be provided to reduce coefficient of friction between the bearing section 48 and the rotating shaft 45.

The top of the fluid container 41 is open to fill the container with the electro-sensitive movable fluid 22.

After the fluid container 41 is filled with the electro-sensitive movable fluid 22, the lid 44 is engaged with the open top of the fluid container 41 to form a closed housing. The lid 44 can be formed from the same material as for the fluid container 41.

The lid 44 has a shaft hole 47 at the center thereof, through which the rotating shaft 45 penetrates. The rotating shaft 47 is provided with a rotational contact point 50 for supplying electricity to the first electrodes 43 through the rotating shaft 45. At the rotational contact point 50, a bearing mechanism can be provided to reduce friction between the rotating shaft 45 and the shaft hole 47. From the rotational contact point 50, conductors are led out to form the first external terminals 53. As the conductors of the rotational points 50, 60, mercury is employable.

In FIG. 3, the lid 44 is designed so as to be engaged with the fluid container 41, but the fluid container 41 and the lid 44 may be designed so that they are screwed up in order to improve the enclosed state, or packing or the like can be interposed between the fluid container 41 and the lid 44 to improve the enclosed state.

The rotational shaft 45 is divided into the upper part and the lower part by a cylindrical rotor 46 disposed in the fluid container 41, and the upper rotating shaft 45a and the lower rotating shaft 45b are electrically insulated from each other. The upper rotating shaft 45a penetrates through the shaft hole 47 provided at the center of the lid 44 and is rotatably borne by the shaft hole, while the lower rotating shaft 45b is rotatably borne by the bearing section 48 provided at the center of the bottom 49 of the fluid container 41. Between the upper rotating shaft 45a and the lower rotating shaft 45b, the cylindrical rotor 46, which rotates together with the rotating shaft 45 in the fluid container 41, is disposed. This cylindrical rotor 46 is in the form of a cylinder having the rotating shaft 45 as a center axis of the rotation and is disposed in such a manner that space is formed between the rotor 46 and the fluid container 41 so that the rotor 46 is not brought into contact with the inner wall surface of the container 41. The ratio of the inner diameter of the fluid container 41 to the diameter of the cylindrical rotor 46 (inner diameter of fluid container 41/diameter of rotor 46) is usually not less than 1.01, preferably 1.05 to 10.0. When the motor is miniaturized by setting the inner diameter of the fluid container 41 to not more than 30 mm and setting the ratio of the inner diameter of the fluid container 41 to the diameter of the cylindrical rotor 46 within the range of 1.5 to 3.0, the rotational torque is increased at the same rotational speed. In other words, this motor (RE type ECF motor) is characterized in that the performance can be improved by being miniaturized.

The shape of the rotor 46 is not limited to a cylindrical one, and various shapes such as a rectangular parallelepiped shape, a shape having a number of protrusions on the surface and a shape having star-like section are employable according to the use purpose. The cylindrical rotor 46 may be hollow. In this case, the hollow portion may be made vacuum or may be filled with air, gas, liquid or solid so that the weight of the rotor is able to be optionally adjusted. By adjusting the weight of the cylindrical rotor 46, the specific gravity of the rotor 46 in the electro-sensitive movable fluid can be adjusted, whereby motion or balance of the rotor 46 can be controlled.

On the surface of the cylindrical rotor 46, the first electrodes 43 and the second electrodes 42 are arranged. The first electrodes 43 are connected with the external terminals 53 through the upper rotating shaft 45a and the rotational contact point 50. The second electrodes 42 are connected with the external terminals 52 through the lower rotating shaft 45b and the rotational contact point 60. The first electrodes 43 are electrically insulated from the second electrodes 42.

The first electrodes 43 and the second electrodes 42 can be formed by extending conductors on the cylindrical surface of the cylindrical rotor 46.

The first electrodes 43 and the second electrodes 42 can be arranged at appropriate positions. FIG. 3 shows an embodiment of arrangement of the electrodes when the cylindrical rotor 46 is seen from above. The first electrodes 43 and the second electrodes 42 are arranged in such a manner that the interval angle θ between the first electrode 43 and the second electrode 42 is usually 1.0° to 180°, preferably 3.0° to 90.0°. The interval angle θ varies depending on the number of the electrodes arranged. Therefore, in order to set the interval angle θ within the above range, the number of the first electrodes 43 and the number of the second electrodes 42 are each 1 to 60. In FIG. 3, the number 46 represents a cylindrical rotor, and the number 53a represents a conductor led out from the first electrode 43, and this conductor may be incorporated into the upper rotating shaft 45a. Alternatively, the conductor and the upper rotating shaft 45a may be united into one body by forming the upper rotating shaft 45a itself from a conductive material.

Likewise, a conductor 52a is lead out from the second electrode 42, and this conductor may be incorporated into the lower rotating shaft 45b. Alternatively, the conductor and the lower rotating shaft 45b may be united into one body by forming the lower rotating shaft 45b itself from a conductive material.

The fluid container 41 having the above-described structure is filled with the electro-sensitive movable fluid 22.

The motor in which the electrodes are arranged on the surface of the cylindrical rotor 46 is referred to herein as "RE type ECF motor (rotor-electrode type electro-conjugate fluid motor)".

In FIG. 3, an embodiment of the RE type ECF motor wherein the cylindrical rotor 46 formed from a column-like material is disposed in the fluid container 41 is shown. On the top of the cylindrical rotor 46, the rotating shaft 45a made of, for example, a metallic round bar is provided.

A plus terminal and a minus terminal of a direct current power source are connected with the external terminal 52 and the external terminal 53, respectively, so that the direct-current-voltage can be applied between the first electrode 43 and the second electrode 42 of the RE type ECF motor. One of the first electrode 43 and the second electrode 42 is set to be a positive electrode and the other is set to be a negative electrode, and in this case, any one of them may be set to be a positive electrode. When the direct-current-voltage is applied, the electro-sensitive movable fluid 22 begins to flow. With the flow (jet flow) of the electro-sensitive movable fluid 22, the cylindrical rotor 46 begins to rotate. The current generated when the direct-current-voltage is applied is very small, usually not more than 0.5 mA, in many cases not more than 20 μA, because the electro-sensitive movable fluid used in the invention is substantially nonconductive.

By applying a direct-current-voltage to the electro-sensitive movable fluid of the invention filled in the SE type ECF motor or the RE type ECF motor having the above structure, the SE type ECF motor or the RE type ECF motor can be driven.

Next, a method of driving, for example, the SE type ECF motor by the use of the electro-sensitive movable fluid of the invention is explained. This motor is so fabricated that the motor comprises a plastic vane rotor having eight vanes and a plastic fluid container of 10 mm in outer diameter, 8 mm in inner diameter and 20 mm in height, and that four pairs of electrodes made of copper wire of 0.3 μm in diameter are arranged on the inner surface of the fluid container. This SE type ECF motor is filled with the electro-sensitive movable fluid and then driven. The rotational speed of the SE type ECF motor, the applied voltage and the current can be measured in the following manner. As for the rotational speed, a plastic disc is fitted to the rotating shaft of the SE type ECF motor as shown in FIG. 4(a). The rotation of the plastic disc is detected by a photo interrupter to measure the rotational speed of the SE type ECF motor. As for the current, series resistance of 1 MΩ is inserted between the SE type ECF motor and the ground as shown in FIG. 4(b). From the potential difference caused by the resistance, the current can be measured. As for the voltage, Zener diode is connected in parallel with the resistance, and the voltage can be measured through a voltage follower using an OP amplifier having sufficiently high input impedance.

For example, a direct-current-voltage of usually 0.1 V to 10 kV, preferably 10 V to 7.0 kV, is applied to the electro-sensitive movable fluid of the invention filled in the above-mentioned apparatus. In this case, the current is usually 0.001 to 100 µA, preferably 0.05 to 10.0 µA, and therefore the power supplied to the SE type ECF motor or the RE type ECF motor (i.e., between the electrodes) is $1 \times 10^{-10}$ to 1.0 W, preferably $5 \times 10^{-7}$ to $7 \times 10^{-2}$ W.

The applied voltage can be appropriately varied depending on scale of the apparatus, kind of the electro-sensitive movable fluid of the invention, construction of the apparatus, etc., but with the proviso that the same apparatus and the same fluid are used under the same conditions, the rotational speed varies in proportion to the applied voltage.

In FIG. 7, an example of a relation between the applied voltage and the rotational speed and an example of a relation between the applied voltage and the current are shown. That is, FIG. 7 shows a relation between the applied voltage and the rotational speed and a relation between the current and the rotational speed given when a voltage up to 6 kV is applied to the SE type ECF motor. As shown in FIG. 7, there are constant proportional relations between the applied voltage and the rotational speed and between the applied voltage and the current.

The control of the rotational speed owing to the control of the voltage can be performed also in the RE type ECF motor using the electro-sensitive movable fluid as well as in the SE type ECF motor.

The mechanism of driving the SE type ECF motor or the RE type ECF motor by the use of the electro-sensitive movable fluid of the invention has not been clarified yet. However, such jet flows as shown in FIG. 5 are confirmed to be produced when a voltage is applied to the electro-sensitive movable fluid, and it is considered that the jet flows become a rotational propulsion force of the motor.

Periodically, the motors driven in high electric fields by the use of dielectric fluids have attracted the attention of scientists, and some reports have been made. For example, more than 40 years ago, there was a report that a glass bar having a diameter of a few mm placed between parallel plate electrodes, which were immersed in a dielectric fluid, began to rotate at a few thousand rpm upon application of about 10 kV. The explanation for occurrence of this phenomenon is as follows. The charge generated on the glass bar surface is attracted by the electrode of the opposite polarity to slightly rotate the glass bar, at this instant the polarization disappears, and the repetition of attraction of the charge and disappearance of the polarization results in occurrence of constant rotation. In this explanation, there is no direct relation between the conductivity of the fluid and the rotary motion of the glass bar. The motor utilizing the above phenomenon is of about a few mm, and it is not reported that a large motor such as the SE type ECF motor or the RE type ECF motor is able to be rotated.

The above theory cannot explain the mechanism of converting electric energy to mechanical energy through the SE type ECF motor or the RE type ECF motor using the electro-sensitive movable fluid of the invention, because the conductivity and the viscosity of the electro-sensitive movable fluid are very important factors of the drive of the motor in the invention.

The mechanism of converting the electric energy to the mechanical energy through the SE type ECF motor or the RE type ECF motor of the invention is investigated below based on the matters having been already confirmed.

The ionic mobility has been reported to be of the order of $10^{-8}$ m$^2$V$^{-1}$S$^{-1}$ in a fluid having a viscosity of a few mpa·s. Assuming that the hydrodynamic radius of ions is within the range of 0.5 to 1.2 nm, the ionic mobility can be estimated, through the Stokes-Einstein equation, as $5 \times 10^{-3}$ m/s in an electric field of 0.5 kVmm$^{-1}$ (5 kV applied between electrodes at an interval of 10 mm). Also, assuming that the ionic motion directly brings about drag flow of the fluid to thereby rotate the motor, the rotational speed may be much slower. Because the SE type ECF motor and the RE type ECF motor rotate at a higher speed by two figures as much as the above-assumed rotational speed, it is difficult to infer that the ionic motion directly brings about a rotary motion of the rotor. When a high voltage is applied to a dielectric fluid as described above, a secondary motion of fluid such as convection or chaos is sometimes brought about. According to the computing simulation on the electrohydrodynamic (EHD) convection under such conditions that the gravitational effect is negligibly small (microgravity conditions), the velocity of the secondary flow is assumed to be about 0.02 m/s at an electric Rayleigh number of 6,000 where the Coulomb force is much larger than the viscous force. However, this value is a little smaller than the flow velocity observed when the electro-sensitive movable fluid of the invention is used, so that the mechanism of the high speed rotation of the rotor cannot be completely explained by only the EHD convection. The EHD convection referred to herein is a non-linear phenomenon controlled by continuous equation, kinetic equation, Maxwell equation and charge transfer equation.

Yabe and Maki have found that when a high voltage of 10 kV is applied to a ring electrode and a plate electrode arranged axisymmetrically, a jet flow of fluid is created in the vicinity of the center of the ring in the direction away from the plate electrode, and they made a report on the findings (see: Int. J. Heat Mass Transfer 31, 407 (1988)). It has been reported that the above phenomenon is such a phenomenon that the fluid attracted from the circumference of the ring is jetted after the fluid passed through a gap between the ring and the plate electrode, and the flow velocity sometimes exceeds 1 m/s. The mechanism of occurrence of the jet flow is not clear, but the velocity of the jet flow is comparable to the circumferential velocity of the rotor in the invention. Since the velocity of the jet flow seems to be similar to that of the electro-sensitive movable fluid when a direct-current-voltage is applied to the movable fluid, those mechanisms may have some relevancy to each other. However, the above fluid composition (flon R113+ ethanol) shows quite different from the movable fluid of the invention, and the above apparatus is also different from that of the invention. For reasons, the relevancy is still unknown.

The description on the mechanism of the present is invention is just an inference which is made by the present inventors based on the confirmed facts and which is intended to assist understanding of the present invention. Therefore, it should be construed that the invention is not limited to the inference.

The electro-sensitive movable fluid of the invention flows upon application of a direct-current-voltage. The jet flow of the movable fluid can be converted to mechanical energy such as rotational energy and can be taken out as the mechanical energy. Further, when the voltage applied to the electro-sensitive movable fluid of the invention is changed to vary the supplied electric energy, the electric energy can be converted to energy of other form in proportion to the amount of the electric energy supplied by the applied voltage, with stepless controlling of the voltage. Accordingly, the electro-sensitive movable fluid of the invention can be used in various fields, for example, a field utilizing the motion of the electro-sensitive movable fluid between the electrodes applied with a direct-current-voltage and a field utilizing the rotational energy which is converted from the jet flow motion of the electro-sensitive movable fluid produced by application of a direct-current-voltage and then taken out of the apparatus. The SE type ECF motor and the RE type ECF motor are typical embodiments. The SE type ECF motor and the RE type ECF motor utilizing the energy conversion control method of the invention is improved in the performance when they are miniaturized. Besides, these motors have simple structures, so that they are very effective as inexpensive, trouble-free micromotors.

As described above, the electro-sensitive movable fluid can be utilized for the rotary mechanism in which the rotor equipped with electrodes is rotated. Further, if a small fragment equipped with electrodes is placed in the electro-sensitive movable fluid and a direct-current-voltage is applied to the electrodes from the outside, the small fragment is able to freely swim like fish in the movable fluid owing to a propulsion force supplied by the fluid jet flow produced between the electrodes.

Furthermore, if a small fragment equipped with electrodes on its bottom surface is floated on the electro-sensitive movable fluid of the invention and a direct-current-voltage is applied to the electrodes, the small fragment is able to freely sail like a boat on the movable fluid surface owing to a propulsion force of the fluid jet flow.

Instead of application of the direct-current-voltage from the external electric source, the direct-current-voltage can be directly applied by means of solar panel, light piezoelectric element or PLZT element capable of generating high voltage by irradiation with light. In this case, the solar panel or the PLZT element is fitted to the driving section together with the electrodes and irradiated with light instead of applying a voltage from the external electric source, whereby no wire from the external electric source is necessary. As a result, the above fragment (fragment moving like a fish or boat) has a high degree of freedom in its motion, and even in a transparent closed container, the motion of the fragment can be controlled without restraint. In other words, for an interior work space where human beings cannot get into, e.g., atomic power station, the system using the electro-sensitive movable fluid of the invention can be used as an inner work apparatus capable of being driven and controlled by irradiation with light through protective glass; therefore, it is very useful.

In the field of computer technology, a great number of semiconductors are used for computers. When the computers are driven, the semiconductors generate heat. Therefore, most of the computers need to be equipped with built-in fans to cool the computers. The cooling fans generally use electromagnetic motors, and such cooling fans generate heat during working. Consequently, the cooling fans must cool not only the semiconductor chips which generate heat during working but also the electromagnetic motors which drive the fans, resulting in large power consumption. Moreover, the size of the electromagnetic motors is large for the size of the semiconductor chips, and this is an obstacle to miniaturization of computer or conservation of energy. On the other hand, the ECF cooling fans using the electro-sensitive movable fluid, which comprise motors fabricated based on the technique of the invention and cooling vanes, hardly generate heat. Besides, they can be driven by a low power and can be miniaturized. Therefore, the ECF cooling fans are most suitable for small computers. In addition, miniaturization of the motors makes it possible to equip the cooling fan for every semiconductor which generates heat. That is, on-chip type cooling fans are employable.

In another use, a linear motor capable of being driven by a linear jet flow of the electro-sensitive movable fluid is available by using a rectangular parallelepiped fluid container in place of the cylindrical fluid container and arranging electrodes on the inner surface of the container. As another mechanism, a linear motor using the above-mentioned fish-like fragment provided with electrodes can be constructed.

The electro-sensitive movable fluid of the invention is specified by the conductivity and the viscosity at a temperature at which the movable fluid is used, and therefore the fluid may be either of an organic compound and an inorganic compound. Accordingly, the electro-sensitive movable fluid of the invention also includes high-temperature inorganic fluids having the prescribed conductivity and viscosity, such as lava extruded from volcanoes (lava flow). If the high-temperature inorganic fluids such as lava flow have the viscosity and conductivity defined by the present invention, those fluids exhibit behaviors equivalent to those of the electro-sensitive movable fluid of the invention. Hence, if the lava flow satisfying the requisite of the electro-sensitive movable fluid of the invention were provided with huge electrodes and a direct-current-voltage were applied to the electrodes, it might be feasible to control a path of the lava flow (direction of the lava flow) by the applied direct-current-voltage.

Since the electro-sensitive movable fluid of the invention can be specified by the viscosity and the conductivity at the working temperature as described above, driving of motors is feasible by application of a direct-current-voltage even in the extremely high-temperature environment where the conventional motors are difficult to use, provided that the viscosity and the conductivity of the fluids used for the motors are within the above-defined range.

EFFECT OF THE INVENTION

The properties required for the electro-sensitive movable fluid of the invention and the ranges of the properties are specified by the present inventors. That is, the properties required for the electro-sensitive movable fluid of the invention are viscosity and conductivity at a temperature at which the movable fluid is used, and no phenomenon suggesting participation of other properties has been found. The temperature is a mere condition to specify the conductivity and the viscosity in the use of the electro-sensitive movable fluid.

Accordingly, the requisite of the electro-sensitive movable fluid of the invention is only that the fluid satisfies the above-defined conductivity and viscosity, irrespective of an organic or inorganic compound. That is, the present invention gets out of the preconceived ideas that electro-sensitive movable fluids are organic compounds and thereby extends a possibility of using the inorganic compounds as the electro-sensitive movable fluids.

When a direct-current-voltage is applied to the electro-sensitive movable fluid of the invention provided with positive and negative electrodes, the movable fluid moves between the electrodes. In other words, the electro-sensitive movable fluid of the invention moves between the electrodes by mere application of a direct-current-voltage without using any physical actuation means such as a pump. Therefore, the electric energy can be directly converted to kinetic energy by the use of the electro-sensitive movable fluid of the invention.

Owing to the movement of the electro-sensitive movable fluid, a continuous, constant and systematic motion of the movable fluid, such as convection of the fluid, can be formed in the container.

By taking the continuous, constant and systematic motion of the movable fluid out of the container in the form of, for example, rotational energy, the electric energy can be transformed to clean and quiet kinetic energy.

Further, the conversion of the electric energy to the kinetic energy is performed by mere applying a direct-current-voltage to a specific single material, so that it is unnecessary to mix plural compounds to prepare a fluid. Furthermore, the electric sensitivity is determined by the properties inherent in the single compound, and variability in the electric sensitivity, which may be caused by the mixing ratio in the case of using mixtures, is small.

Since the electro-sensitive movable fluid of the invention is a stable ester compound, and it is quite safe to the human body. Moreover, since the movable fluid substantially contains no halogen atoms, environmental pollution of the earth caused by the halogen atoms is not brought about.

By the use of the electro-sensitive movable fluid of the invention, an extremely small sized actuator can be manufactured, and because of its simple internal structure, the actuator is almost free from troubles.

The electro-sensitive movable fluid of the invention works upon application of a direct-current-voltage as described above, and the current is very low under those conditions. Hence, the SE type ECF motor or the RE type ECF motor using the electro-sensitive movable fluid of the invention can be driven for a long period of time by means of small-sized batteries. In addition, these motors have simple structures, they are almost free from troubles, and they are able to convert the electric energy to the kinetic energy at low costs.

Production of a jet flow of the electro-sensitive movable fluid of the invention upon application of a voltage means that the applied electric energy is directly converted to the kinetic energy. Therefore, if a fluid begins to flow upon application of a voltage, this fluid is an electro-sensitive movable fluid. A fluid, which shows a high flow velocity when the applied voltage is made constant, is an electro-sensitive movable fluid capable of preferably converting the electric energy to the kinetic energy.

Furthermore, since the jet flow of the electro-sensitive movable fluid of the invention can be produced when an electric field is formed, the movable fluid can be applied to the above-mentioned various uses.

EXAMPLE

The present invention will be further described with reference to the following examples, but it should be construed that the invention is in no way limited to those examples.

Example 1

The compounds (1) to (36) listed below were measured on the viscosity and the electric resistance (conductivity) at 25° C. Measurement of the viscosity and the electric resistance was performed by the use of a rheometer (Rheo-Stress RS100 of HAAKE Co.). In detail, the compound was sandwiched between two discs each having a diameter of 3.5 cm, and thereto was applied a direct-current-voltage of 2 kV to measure the conductivity (S/m upon application of 2 kV/mm). In the same state, the viscosity of the compound was measured with rotating one of the discs. The values of the conductivity and the viscosity referred to herein are those determined by the above methods.

The compound was filled in such a SE type ECF motor as shown in FIG. 2. Then, a direct-current-voltage of 6 kV was applied to the compound at 25° C. to examine whether the vane rotor rotated or not and to measure the rotational speed when the rotor rotated.

In the SE type ECF motor used herein, the inner diameter of the bottomed cylindrical container was 20 mm, the number of vanes was 8, and each vane had a height of 35 mm and a width of 17 mm. When 12 ml of the movable fluid was introduced into the container, the vanes were completely immersed in the fluid.

The SE type ECF motor was provided with 4 electrodes. The first and the third electrodes were set to be negative electrodes, and the second and the fourth electrodes were set to be positive electrodes. These four electrodes were arranged in such a manner that the interval angle between the first and the third electrodes and the interval angle between the second and the fourth electrodes were each 180° and the interval angle between the first and the second electrodes and the interval angle between the third and the fourth electrodes were each 45°.

Into the SE type ECF motor having the above structure, 12 ml of the fluid was introduced, and a direct-current-voltage of 6 kV was applied between the electrodes to examine whether the SE type ECF motor was driven or not and to measure the rotational speed when the motor was driven. The conductivity, the viscosity and the electric sensitivity of the dielectric fluids used are set forth in Table 3.

TABLE 3

| Compound (™: trademark) | | Conductivity (S/m) | Viscosity (Pa · s) | Electric Sensitivity (6 kV) |
|---|---|---|---|---|
| (1) | DBA | $3.01 \times 10^{-9}$ | $3.5 \times 10^{-3}$ | ◆ driven at 147 rpm |
| (2) | TBC | $5.71 \times 10^{-7}$ | $2.0 \times 10^{-2}$ | ◇ not driven |
| (3) | MBM | $2.60 \times 10^{-5}$ | $2.0 \times 10^{-2}$ | ◇ not driven |
| (4) | DAM | $7.80 \times 10^{-7}$ | $2.5 \times 10^{-3}$ | ◇ not driven |
| (5) | DMP | $3.90 \times 10^{-7}$ | $1.2 \times 10^{-2}$ | ◇ not driven |
| (6) | Triacetin ™ | $3.64 \times 10^{-9}$ | $1.4 \times 10^{-2}$ | ◆ driven at 77 rpm |
| (7) | Ethyl cellosolve acetate | $7.30 \times 10^{-5}$ | $9.0 \times 10^{-4}$ | ◇ not driven |
| (8) | 2-(2-Ethoxyethoxy)ethyl acetate | $6.24 \times 10^{-7}$ | $1.4 \times 10^{-2}$ | ◇ not driven |
| (9) | 1,2-Diacetoxyethane | $2.00 \times 10^{-6}$ | $1.5 \times 10^{-3}$ | ◇ not driven |
| (10) | Triethylene glycol acetate | $5.20 \times 10^{-7}$ | $8.1 \times 10^{-3}$ | ◇ not driven |
| (11) | Butyl cellosolve acetate | $2.10 \times 10^{-8}$ | $7.0 \times 10^{-4}$ | ◆ driven at 129 rpm |
| (12) | Butyl carbitol acetate | $5.20 \times 10^{-8}$ | $1.7 \times 10^{-3}$ | ◆ driven at 155 rpm |
| (13) | Solfit AC ™ | $8.30 \times 10^{-8}$ | $6.0 \times 10^{-4}$ | ◆ driven at 158 rpm |
| (14) | DBF | $2.65 \times 10^{-9}$ | $3.5 \times 10^{-3}$ | ◆ driven at 178 rpm |

TABLE 3-continued

| Compound (™: trademark) | | Conductivity (S/m) | Viscosity (Pa · s) | Electric Sensitivity (6 kV) |
|---|---|---|---|---|
| (15) | Placizer B-8 ™ | $1.10 \times 10^{-8}$ | $7.8 \times 10^{-2}$ | ◇ not driven |
| (17) | PMA | $1.56 \times 10^{-7}$ | $6.0 \times 10^{-4}$ | ◆ driven at 162 rpm |
| (18) | MAR-N ™ | $1.30 \times 10^{-8}$ | $1.3 \times 10^{-2}$ | ◆ driven at 53 rpm |
| (19) | Exepal EH-P ™ | $2.60 \times 10^{-10}$ | $9.5 \times 10^{-3}$ | ◇ not driven |
| (20) | DBI | $1.46 \times 10^{-8}$ | $3.5 \times 10^{-3}$ | ◆ driven at 167 rpm |
| (21) | Emanone 4110 ™ | $3.75 \times 10^{-7}$ | $8.0 \times 10^{-2}$ | ◇ not driven |
| (22) | Exepal BS ™ | $3.10 \times 10^{-10}$ | $8.5 \times 10^{-3}$ | ◇ not driven |
| (23) | Kyowanol D ™ | $6.24 \times 10^{-9}$ | $4.0 \times 10^{-3}$ | ◆ driven at 138 rpm |
| (24) | Kyowanol M ™ | $6.80 \times 10^{-8}$ | $1.2 \times 10^{-2}$ | ◇ not driven |
| (25) | MP-Ethoxypropanol ™ | $6.24 \times 10^{-5}$ | $8.0 \times 10^{-4}$ | ◇ not driven |
| (26) | BP-Ethoxypropyl Acetate ™ | $3.10 \times 10^{-8}$ | $6.0 \times 10^{-4}$ | ◆ driven at 143 rpm |
| (27) | Sansocizer E-4030 ™ | $5.46 \times 10^{-9}$ | $2.0 \times 10^{-2}$ | ◆ driven at 58 rpm |
| (28) | Sansocizer DOTP ™ | $6.20 \times 10^{-10}$ | $4.0 \times 10^{-2}$ | ◆ driven at 35 rpm |
| (29) | TBP | $2.20 \times 10^{-6}$ | $2.2 \times 10^{-3}$ | ◇ not driven |
| (30) | TBXP | $1.10 \times 10^{-5}$ | $9.0 \times 10^{-3}$ | ◇ not driven |
| (31) | CLP | $7.80 \times 10^{-6}$ | $3.0 \times 10^{-2}$ | ◇ not driven |
| (32) | Ethyl 2-methylacetoacetate | $1.00 \times 10^{-4}$ | $5.0 \times 10^{-4}$ | ◇ not driven |
| (33) | 1-Ethoxy-2-acetoxypropane | $4.41 \times 10^{-7}$ | $4.0 \times 10^{-4}$ | ◆ driven at 161 rpm |
| (34) | DCM-40 ™ | $2.60 \times 10^{-5}$ | $5.5 \times 10^{-3}$ | ◇ not driven |
| (35) | Linalyl acetate | $1.82 \times 10^{-9}$ | $1.3 \times 10^{-3}$ | ◆ driven at 258 rpm |
| (36) | Dibutyl decanedioate | $1.40 \times 10^{-9}$ | $7.0 \times 10^{-3}$ | ◆ driven at 132 rpm |

The relation between the conductivity and the viscosity set forth in table 3 is shown in FIG. 1, in which the conductivity and the viscosity of the fluid which was driven are represented by symbol ◆, and the conductivity and the viscosity of the fluid which was not driven are represented by symbol ☆.

Example 2

The SE type ECF motor of Example 1 was filled with 2,2,4-trimethyl-1,3-pentanediol monoisobutyrate (compound (24), trade name: Kyowanol M), and a direct-current-voltage of 6 kV was applied. Since 2,2,4-trimethyl-1,3-pentanediol monoisobutyrate had a conductivity σ of $6.80 \times 10^{-8}$ S/m and a viscosity η of $1.2 \times 10^{-2}$ Pa·s at 25° C. as shown in Tables 3 and 4, the SE type ECF motor was not driven.

Separately, the SE type ECF motor was filled with 2-ethylhexyl palmitate (compound (19), trade name: Exepal EH-P), and a direct-current-voltage of 6 kV was applied. Since 2-ethylhexyl palmitate had a conductivity σ of $2.60 \times 10^{-10}$ S/m and a viscosity η of $9.5 \times 10^{-3}$ Pa·s at 25° C. as shown in Tables 3 and 4, the SE type ECF motor was not driven.

Then, 2,2,4-trimethyl-1,3-pentanediol monoisobutyrate (compound (24), trade name: Kyowanol M) and 2-ethylhexyl palmitate (compound (19), trade name: Exepal EH-P) were mixed in a mixing ratio of 1:4 by weight to prepare a homogeneous mixture (37).

This mixture (37) was measured on the conductivity and the viscosity in the same manner as in Example 1. As a result, the mixture had a conductivity σ of $2.60 \times 10^{-9}$ S/m and a viscosity η of $9.8 \times 10^{-3}$ Pa·s at 25° C.

Then, the SE type ECF motor was filled with the mixture (37), and a direct-current-voltage of 6 kV was applied at 25° C. in the same manner as described above. As a result, the motor was driven at 38 rpm.

The results are set forth in Table 4.

Example 3

The SE type ECF motor of Example 1 was filled with diallyl maleate (DAM, compound (4)), and a direct-current-voltage of 6 kV was applied. Since diallyl maleate had a conductivity σ of $7.80 \times 10^{-7}$ S/m and a viscosity η of $2.5 \times 10^{-3}$ Pa·s at 25° C. as shown in Tables 3 and 4, the SE type ECF motor was not driven.

Separately, the SE type ECF motor was filled with butyl stearate (compound (22), trade name: Exepal BS), and a direct-current-voltage of 6 kV was applied. Since butyl stearate had a conductivity G of $3.10 \times 10^{-10}$ S/m and a viscosity η of $8.5 \times 10^{-3}$ Pa s at 25° C. as shown in Tables 3 and 4, the SE type ECF motor was not driven.

Then, diallyl maleate (compound (4), DMA) and butyl stearate (compound (22), trade name: Exepal BS) were mixed in a mixing ratio of 1:4 by weight to prepare a homogeneous mixture (38).

This mixture (38) was measured on the conductivity and the viscosity in the same manner as in Example 1. As a result, the mixture had a conductivity σ of $4.17 \times 10^{-9}$ S/m and a viscosity η of $5.0 \times 10^{-3}$ Pa·s at 25° C.

Then, the SE type ECF motor was filled with the mixture (38), and a direct-current-voltage of 6 kV was applied at 25° C. in the same manner as described above. As a result, the motor was driven at 140 rpm.

The results are set forth in Table 4.

TABLE 4

| Compound or Mixture (™: trademark) | | Conductivity (S/m) | Viscosity (Pa · s) | Electric Sensitivity (6 kV) |
|---|---|---|---|---|
| (24) | Kyowanol M ™ | $6.80 \times 10^{-8}$ | $1.2 \times 10^{-2}$ | ◇ (not driven) |
| (19) | Exepal EH-P ™ | $2.60 \times 10^{-10}$ | $9.5 \times 10^{-3}$ | ◇ (not driven) |
| (37) | (24) + (19) | $2.60 \times 10^{-9}$ | $9.8 \times 10^{-3}$ | ◆ (driven at 38 rpm) |

TABLE 4-continued

| Compound or Mixture (™: trademark) | Conductivity (S/m) | Viscosity (Pa · s) | Electric Sensitivity (6 kV) |
|---|---|---|---|
| (24):(19) = 1:4 | | | |
| (4) DAM | $7.80 \times 10^{-7}$ | $2.5 \times 10^{-3}$ | ◇ (not driven) |
| (22) Exepal BS ™ | $3.10 \times 10^{-10}$ | $8.5 \times 10^{-3}$ | ◇ (not driven) |
| (38) (4) + (22) | $4.17 \times 10^{-9}$ | $5.0 \times 10^{-3}$ | ◆ (driven at 140 rpm) |
| (4):(22) = 1:4 | | | |

The relation between the conductivity and the viscosity set forth in Table 4 is shown in FIG. 1, in which the conductivity and the viscosity of the fluid which was driven are represented by symbol ◆, and the conductivity and the viscosity of the fluid which was not driven are represented by symbol ◇.

Example 4

The SE type ECF motor of Example 1 was filled with 2-ethylhexyl benzyl phthalate (compound (15), trade name: Placizer B-8), and a direct-current-voltage of 6 kV was applied while maintaining the temperature of the 22-ethylhexyl benzyl phthalate at 25° C. Since 2-ethylhexyl benzyl phthalate had a conductivity σ of $1.10 \times 10^{-8}$ S/m and the viscosity η $7.8 \times 10^{-2}$ Pa·s at 25° C. as shown in Tables 3 and 5, the Se type ECF motor was not driven.

Then, 2-ethylhexyl benzyl phthalate (compound (15), trade name: Placizer B-8) was heated to 100° C. to obtain a heated product (39). This heated product (39) was measured on the conductivity and the viscosity at 100° C. As a result, the heated product had a conductivity σ of $9.90 \times 10^{-9}$ S/m and a viscosity η of $3.5 \times 10^{-3}$ Pa·s at 100° C.

Then, a direct-current-voltage of 6 kV was applied in the same manner as in Example 1, except that the SE type ECF motor was filled with the heated product (39) and the temperature of the product (2-ethylhexyl benzyl phthalate) was maintained at 100° C. As a result, the motor was driven at 21 rpm.

The results are set forth in Table 5.

TABLE 5

| Compound or Mixture (™ : trademark) | Conductivity (S/m) | Viscosity (Pa · s) | Electric Sensitivity (6 kV) |
|---|---|---|---|
| (15) Placizer B-8 ™ (25° C.) | $1.10 \times 10^{-8}$ | $7.8 \times 10^{-2}$ | ◇ (not driven) |
| (39) Placizer B-8 ™ (100° C.) | $9.90 \times 10^{-9}$ | $3.5 \times 10^{-2}$ | ◆ (driven at 21 rpm) |

The relation between the conductivity and the viscosity set forth in Table 5 is shown in FIG. 1, in which the conductivity and the viscosity of the fluid which was driven are represented by symbol ◆, and the conductivity and the viscosity of the fluid which was not driven are represented by symbol ◇.

Example 5

A SE type ECF motor shown in FIG. 2 was fabricated, wherein the fluid container made of an acrylic resin had an outer diameter of 10 mm, an inner diameter of 8 mm and a height of 20 mm, and the vane rotor had 8 vanes made of an acrylic resin. This SE type ECF motor was provided with four pairs of electrodes each made of wire having a diameter of 0.3 mm. The interval angle between the electrodes was set to be 22.5° (1.5 mm). The rotating shaft of the vane rotor is made of wire having a diameter of 1 mm. As the bearing, ball bearings were used to reduce friction torque. To the rotating shaft, a plastic disc was fitted as shown in FIG. 4, and the rotation of the disc was detected by means of a photointerrupter to measure the rotational circumferential speed. As shown in FIG. 4, a resistance of 1 MΩ was provided in series between the SE type ECF motor and the ground to obtain a current from the electric potential. In order to protect the measuring device, Zener diode was connected in parallel with the resistance, and the voltage was measured through a voltage follower using an OP amplifier having sufficiently high input impedance.

The SE type ECF motor was filled with dibutyl decanedioate. Then, a voltage was applied with varying the applied voltage by 1 kV in the range of 0 to 6 kV, to measure the rotational speed and the current.

The SE type ECF motor began to rotate at the applied voltage of 2 kV, and the rotational speed was increased in proportion to the applied voltage.

The relation among the applied voltage, the rotational speed and the current is shown in FIG. 7. As is clear from FIG. 7, the rotational speed was increased in proportion to the applied voltage.

Example 6

The SE type ECF motor shown in FIG. 2 was filled with dibutyl decanedioate as the electro-sensitive movable fluid. Then, a direct-current-voltage was applied between the electrodes with varying the applied voltage to 2.5 kV, 3.0 kV, 3.5 kV, 4.0 kV, 4.5 kV, 5.0 kV, 5.5 kV and 6.0 kV, to measure the rotational speed of the vane rotor. The results are shown in FIG. 8(a).

Example 7

In the SE type ECF motor shown in FIG. 2, dibutyl decanedioate was used as the electro-sensitive movable fluid and the number of vanes was varied to 2, 3, 4, 6 or 8. In each case, the rotational speed of the vane rotor was measured (applied voltage: 6 kV). The results are shown in FIG. 8(b). As the number of vanes was increased, the rotational speed was increased. As the interval between the electrodes was narrowed, the rotational speed was increased. As the number of pairs of the electrodes was increased, the rotational speed was increased. The rotational speed was independent from the interval between the pairs of electrodes.

Example 8

In the SE type ECF motor shown in FIG. 2, dibutyl decanedioate was used as the electro-sensitive movable fluid, the diameter of the fluid container was varied to 20 mm, and the diameter of the vane rotor was varied to 6 mm, 13 mm or 17 mm. In each case, the rotational speed and the output torque were measured. For measuring the output torque, an apparatus shown in FIG. 11 was used. The results are shown in FIG. 8(c).

Referring to FIG. 11, the number 30 represents a SE type ECF motor or a RE type ECR motor, the number 31 represents wire strain gauge, the number 32 represents a micrometer, the number 33 represents a micrometer head, the number 34 represents a rotating shaft, a number 35 represents a wire. The wire 35 is spread between two poles each fitted to the corresponding strain gauge 31 respectively, and is wound once on the rotating shaft 34. When the rotating shaft 34 rotates, a difference of tension force of the wire is produced. The difference of the tension force between the right and left sides is measured by the strain gauge to determine the output torque (rotational torque). That is, the load torque given when the flexible wire 35 is wound once on the rotating shaft 34 of the SE type ECF motor is a friction torque (DF/2). The difference of the tension force ($T_1$-$T_2$) of the wire 35 is assumed to be equal to the friction force F acted on the output shaft, so that the output torque is calculated as D ($T_1$-$T_2$)/2.

As is clear from FIG. 8(c), the vane rotor 18 was efficiently rotated by the jet flow of dibutyl decanedioate, and the electric energy was able to be transformed to rotational energy. With increase of the rotational speed, the output torque was reduced linearly. The current in the measurement of the output torque was 2.2 $\mu$A irrespective of the vane rotor diameter and the output torque.

Example 9

In the SE type ECF motor shown in FIG. 2, dibutyl decanedioate was used as the electro-sensitive movable fluid, and the diameter of the fluid container and the diameter of the vane rotor were varied to 12 mm and 9 mm, respectively, 16 mm and 13 mm respectively, or 20 mm and 17 mm, respectively. In each case, the rotational speed and the output torque were measured. The results are shown in FIG. 8(d). When the ratio of the diameter of the vane rotor 18 to that of the fluid container 2 was set to be constant 0.8, a higher output torque at the same rotational speed was obtained with a smaller diameter of the fluid container 2. The current was almost the same and the values thereof were 4.5 $\mu$A for 12 mm (fluid container diameter), 3.2 $\mu$A for 16 mm, and 2.2 $\mu$A for 20 mm. Based on the results shown in FIG. 8(d), when the fluid container 2 having a diameter of 12 mm was used, the output power was 0.30 mW and the energy conversion efficiency was 1.1%. It was confirmed that when the ratio of the vane rotor diameter to the fluid container diameter was constant, a higher output torque was obtained with a smaller diameter of the fluid container. This result suggests that the SE type ECF motor is suitable for miniaturization.

From the output power obtained above, an output power density to the volume of the motor was calculated. The volume of the motor was calculated as a value of vane rotor length x fluid container sectional area. The results are shown in FIG. 9(a). As is clear from FIG. 9(a), the output power density was remarkably improved by miniaturizing the SE type ECF motor. Therefore, the SE type ECF motor is suitable for miniaturization.

Example 10

In the RE type ECF motor shown in FIG. 3, dibutyl decanedioate was used as the electro-sensitive movable fluid and the interval angle between the rod type electrodes was varied to 11°, 23° or 45°. In each case, the rotational speed and the output torque were measured. The results are set forth in Table 9(b). The interval angle between the electrodes hardly influenced the rotational speed of the cylindrical rotor 46. That is, the characteristics of the RE type ECF motor are not determined only by an equivalent electric field strength obtained by dividing the voltage by the interval between the electrodes. Assuming that the circumferential rate of the rotor with no-load is almost equal to a flow rate of the dibutyl decanedioate, the circumferential rate is about 120 mm/S, and this suggests that a higher rotational speed may be obtained by miniaturizing the RE type ECF motor.

Example 11

In the RE type ECF motor shown in FIG. 3, dibutyl decanedioate was used as the electro-sensitive movable fluid, the interval angle between the electrodes was set to be 23°, the diameter of the cylindrical rotor was made to be 10 mm, and the diameter of the fluid container was varied to 14 mm, 20 mm, 30 mm or 40 mm. In each case, rotational speed and the output torque were measured. The results are set forth in FIG. 9(c). When the diameter of the fluid container 41 was 14 mm, a high output torque was obtained, but the rotational speed in the no-load state was decreased. The reason is assumably that because of a narrow gap between the fluid container 41 and the cylindrical rotor 46, the jet flow of the dibutyl decanedioate is able to be efficiently transformed to the rotary motion owing to the viscous force of the fluid, while the loss of energy is increased because of the viscous force, resulting in that a high rotational speed is not obtained particularly in the no-load state.

Example 12

In the RE type ECF motor shown in FIG. 3, dibutyl decanedioate was used as the electro-sensitive movable fluid, the diameter of the fluid container and the diameter of the vane rotor were varied to 14 mm and 10 mm, respectively, 20 mm and 16 mm respectively, or 24 mm and 20 mm, respectively. In each case, the rotational speed and the output torque were measured. The results are shown in FIG. 9(d). With a smaller diameter of the fluid container 41, the output torque at the same rotational speed was increased and the change of the rotational speed for the load torque was increased. Based on the results shown in FIG. 9(d), the maximum value of the output power was 0.32 mW when the diameter of the fluid container and the diameter of the cylindrical rotor of the RE type ECF motor were 14 mm and 10 mm, respectively.

Example 13

In the SE type ECF motor shown in FIG. 2, dibutyl decanedioate was used as the electro-sensitive movable fluid, and the diameter of the fluid container and the diameter of the vane rotor were varied to 14 mm and 10 mm, respectively, 20 mm and 16 mm respectively, or 24 mm and 20 mm, respectively. In each case, the rotational speed and the output torque were measured. The results are shown in FIG. 10(a). In comparison with Example 12, the output power of the SE type ECF motor was higher than that of the RE type ECF motor, but the RE type ECF motor was superior to the SE type ECF motor in the change of the rotational speed for the load torque.

Example 14

In the RE type ECF motor shown in FIG. 3, dibutyl decanedioate was used as the electro-sensitive movable fluid, the diameter of the fluid container was made to be 30 mm, and the diameter of the cylindrical rotor was varied to 10 mm, 16 mm or 20 mm. In each case, the rotational speed and the output torque were measured. The results are shown in FIG. 10(*b*). When the diameter of the cylindrical rotor 46 was 20 mm, a high output torque was obtained.

Example 15

In the RE type ECF motor shown in FIG. 3, dibutyl decanedioate was used as the electro-sensitive movable fluid, and the diameter of the fluid container and the diameter of the vane rotor were varied to 20 mm and 10 mm, respectively, 30 mm and 16 mm respectively, or 40 mm and 20 mm, respectively. In each case, the rotational speed and the output torque were measured. The results are shown in FIG. 10(*c*). It was found that with a smaller diameter of the fluid container 41, the output torque at the same rotational speed was increased and the change of the rotational speed for the load torque was increased.

Example 16

A SE type ECF motor with the same structure as shown in FIG. 2 and larger than the motor of Example 1 was used. This SE type ECF motor is provided with a bottomed cylindrical container having an inner diameter of 26 mm as the fluid container and a vane rotor having 6 vanes each being large in proportion to the container's size. The fluid container was provided with 8 electrodes (3*a* to 3*h*), wherein 3*a* and 3*e* were set to be positive electrodes and the remainders 3*b*, 3*c*, 3*d*, 3*f*, 3*g* and 3*h* were grounded so as to be negative electrodes.

The fluid container was filled with about 17 ml of 2,2,4-trimethyl-1,3-pentanediol diisobutyrate represented by the following formula (trade name: Kyowanol D, available from Kyowa Hakko Kogyo Co., Ltd.), and a direct-current-voltage of 5 kV or 6 kV was applied.

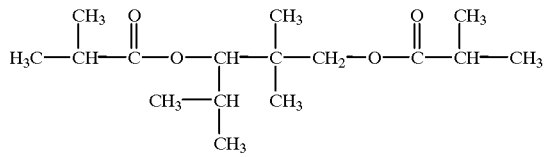

When the direct-current-voltage was applied, the rotor 18 having 6 vanes began to rotate and continued to rotate during the application of voltage. When the voltage was varied to 6 kV from 5 kV; the rotational speed was increased. The results are set forth in Table 6. The measurement of the current in Examples 15 to 29 was carried out by means of a commercially available ammeter. The lower limit of the measurement by this ammeter is 0.05 mA. By the expression "<0.05 unmeasurable" in the following tables is meant that the current was lower than the lower limit of the measurement by the ammeter.

TABLE 6

| Voltage (DC-kV) | 5.0 | 6.0 |
|---|---|---|
| Rotational speed (rpm) | 72 | 100 |
| Current (mA) | <0.05 unmeasurable | <0.05 unmeasurable |

Example 17

The procedure of Example 16 was repeated except that glycerol triacetate represented by the following formula (alias "triacetin", available from Daihachi Chemical Industry Co., Ltd.) was used in the same amount in place of 2,2,4-trimethyl-1,3-pentanediol diisobutyrate (trade name: Kyowanol D, available from Kyowa Hakko Kogyo Co., Ltd.) and the applied voltage was varied to 6.0 kV.

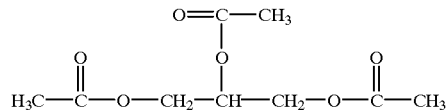

When a direct-current-voltage of 6 kV was applied, the rotor 18 began to rotate at 60 rpm. The pointer of the ammeter was confirmed to slightly move at the moment the voltage was applied. However, the current was lower than the lower limit (0.05 mA) of the measurement by the ammeter and the accurate value was unable to be measured.

Example 18

The procedure of Example 16 was repeated except that a container provided with 16 electrodes at the same intervals on the inner surface was used in place of the container provided with 8 electrodes at the same intervals on the inner surface.

The fluid filled in the container was 2,2,4-trimethyl-1,3-pentanediol diisobutyrate which was the same fluid as used in Example 16.

Of the electrodes, the first, fifth, ninth and thirteenth electrodes clockwise numbered were set to be positive ones, and the second, sixth, tenth and fourteenth electrodes were grounded so as to be set to be negative ones. Then, a direct-current-voltage of 6 kV was applied. The third, fourth, seventh, eighth, eleventh, twelfth, fifteenth and sixteenth electrodes were dummy electrodes. The interval between the positive and negative electrodes in the case of using 16 electrodes was ½ of the interval in the case of using 8 electrodes.

When a direct-current-voltage of 6 kV was applied, the rotor 18 began to rotate and continued to rotate at 158 rpm during the application of voltage. The pointer of the ammeter was confirmed to slightly move at the moment the voltage was applied. However, the current was lower than the lower limit (0.05 mA) of the measurement by the ammeter and the accurate value was unable to be measured, similar to the case of using 8 electrodes.

As a result, it was confirmed that the rotational speed of the rotor was increased with a smaller interval between the positive and negative electrodes.

Further, when the direct-current-voltage was applied in the manner described in Examples 16 to 18, rise of the electro-sensitive movable fluid along either of the positive and negative electrodes was observed.

Example 19

The procedure of Example 16 was repeated except that 15 ml of 2-methoxy-1-methylethyl acetate represented by the following formula (trade name: Arcosolve PMA, available from Kyowa Hakko Kogyo Co., Ltd.) was used as the electro-sensitive movable fluid. That is, in this example, a vane rotor provided with 6 vanes at the same intervals was used, 15 ml of 2-methoxy-1-methylethyl acetate represented by the following formula was used as the electro-sensitive movable fluid, the electrodes 3*a* and 3*e* were set to be positive electrodes and the remainders were grounded so as to be negative ones, and a direct-current-voltage was applied.

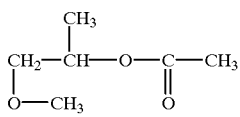

As a result, the vane rotor began to rotate immediately after the application of voltage and continued to rotate during the application of voltage. The relation between the applied voltage and the rotational speed is set forth in Table 7. As is clear from Table 7, the current during the application of voltage was lower than the lower limit (0.05 mA) of the measurement by the ammeter.

TABLE 7

| Voltage (DC-kV) | 5.0 | 6.0 |
|---|---|---|
| Rotational speed (rpm) | 109 | 152 |
| Current (mA) | <0.05 unmeasurable | <0.05 unmeasurable |

Example 20

The vane rotor was rotated in the same manner as in Example 19, except that a mixture of the compounds represented by the following formulas was used as the electro-sensitive movable fluid in place of 2-methoxy-1-methylethyl acetate (trade name: Arcosolve PMA, available from Kyowa Hakko Kogyo Co., Ltd.).

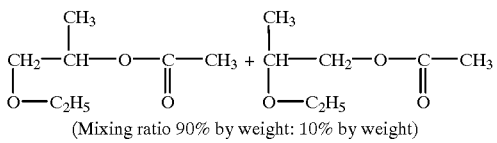
(Mixing ratio 90% by weight: 10% by weight)

That is, this electro-sensitive movable fluid was a mixture of isomers of propylene glycol monoethyl ether acetate (trade name: BP Ethoxypropyl Acetate, available from Kyowa Hakko Kogyo Co., Ltd.). The relation between the applied voltage and the rotational speed is set forth in Table 8. As is clear from Table 8, the current during the application of voltage was lower than the lower limit (0.05 mA) of the measurement by the ammeter.

TABLE 8

| Voltage (DC-kV) | 5.0 | 6.0 |
|---|---|---|
| Rotational speed (rpm) | 61 | 106 |
| Current (mA) | <0.05 unmeasurable | <0.05 unmeasurable |

Example 21

The electro-sensitive movable fluid used in Example 20 was a mixture of two compounds, and the fluid showed good electric sensitivity.. In this example, one of the compounds, 1-ethoxy-2-acetoxypropane represented by the following formula, was used as the electro-sensitive movable fluid.

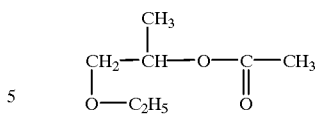

That is, the procedure of Example 19 was repeated except that 1-ethoxy-2-acetoxypropane (available from Wako Junyaku K.K.) which is one of the compounds of the mixture used in Example 20 was used singly without mixing it with any other components or adding any other components. The relation between the applied voltage and the rotational speed is set forth in Table 9. As is clear from Table 9, the current during the application of voltage was lower than the lower limit (0.05 mA) of the measurement by the ammeter.

TABLE 9

| Voltage (DC-kV) | 5.0 | 6.0 |
|---|---|---|
| Rotational speed (rpm) | 82 | 180 |
| Current (mA) | <0.05 unmeasurable | <0.05 unmeasurable |

Example 22

A direct-current-voltage of 5.0 kV was applied in the same manner as in Example 19, except that dibutyl diglycol adipate represented by the following formula (trade name: BXA, available from Daihachi Chemical Industry Co., Ltd.) was used in place of 2-methoxy-1-methylethyl acetate (trade name: Arcosolve PMA, available from Kyowa Hakko Kogyo Co., Ltd.).

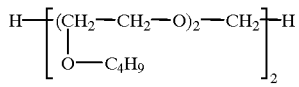

As a result, the rotor began to rotate immediately after the application of voltage and continued to rotate during the application of voltage. However, the rotational speed was not constant and one rotation took 2.3 to 6.5 seconds.

In addition, there was also observed sudden stop of the rotor or vigorous right-left vibration of the rotor followed by the normal rotary motion. The cause of such behaviors has not been clarified yet, but those behaviors seem to be phenomena specifically observed in some of the compounds represented by the formula [II]. In each case, the current during the application of voltage was lower than the lower limit (0.05 mA) of the measurement by the ammeter.

Example 23

The applied voltage and the rotational speed were measured in the same manner as in Example 19 by means of the same SE type ECF motor as in Example 19, except that 3-methoxy-3-methylbutyl acetate represented by the following formula (trade name: Solfit Acetate, available from Kuraray Co., Ltd.) was used as the electro-sensitive movable fluid.

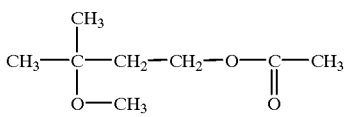

The results are set forth in Table 10.

TABLE 10

| Voltage (DC-kV) | 5.0 | 6.0 |
|---|---|---|
| Rotational speed (rpm) | 75 | 110 |
| Current (mA) | <0.05 unmeasurable | <0.05 unmeasurable |

Example 24

The applied voltage and the rotational speed were measured in the same manner as in Example 19 by means of the same SE type ECF motor as in Example 19, except that diethylene glycol butyl ether acetate represented by the following formula (trade name: Butyl Carbitol Acetate, available from Union Carbide) was used as the electro-sensitive movable fluid.

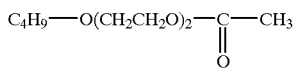

The results are set forth in Table 11.

TABLE 11

| Voltage (DC-kV) | 5.0 | 6.0 |
|---|---|---|
| Rotational speed (rpm) | 82 | 135 |
| Current (mA) | <0.05 unmeasurable | <0.05 unmeasurable |

Example 25

The compound represented by the following formula [D] or [D-1], each of which is very similar to the compound of the formula [III], is also employable as the electro-sensitive movable fluid of the invention.

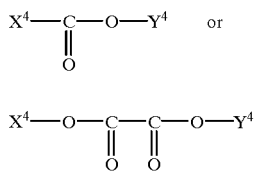

The compounds represented by the above formulas are compounds wherein $X^4$ and $Y^4$ are linked by an ester linkage. $X^4$ and $Y^4$ may be the same as or different from each other. $X^4$ and $Y^4$ are each basically a monovalent hydrocarbon group and may contain a hetero atom such as an oxygen atom, a nitrogen atom or a sulfur atom. Further, $X^4$ and $Y^4$ may have a functional group such as a double bond and may be linear or branched. However, the compound represented by the formula [D] contains no halogen atom (e.g., chlorine atom, fluorine atom, bromine atom, iodine atom). By virtue of the absence of halogen atom in the electro-sensitive movable fluid of the invention, even when the electro-sensitive movable fluid is applied to an apparatus made of a metal, the corrosion of the apparatus does not take place, and the movable fluid is safe to the human body or the environment even when it is decomposed. The presence of a small amount of halogen atom had been thought to be essential to the movable fluid in the past, but as a result of studies by the present inventors, it has been found that the structure was more dominative than the presence of halogen atom in the electricity-sensitive working fluids. Accordingly, the presence of a halogen atom is not essential to the electro-sensitive movable fluid of the invention. On the contrary, in consideration of corrosion of the apparatus or bad influences on the human body and the environment, it is preferable that no halogen atom is contained in the electro-sensitive movable fluid of the invention.

Of the compounds represented by the formula [D], those having an epoxy group present in the following formula or 3,7-dimethyl-1,6-octadien-3-yl acetate represented by the following formula (trade name: Linalyl Acetate, available from Kurarey Co., Ltd.) are preferable from the viewpoint of the action of converting electric energy to rotational energy.

Example Using Compound Having Epoxy Group

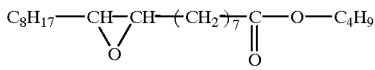

The SE type ECF motor having a vane motor with 6 vanes, which was used in Example 19, was filled with about 15 ml of 9,10-epoxy butyl stearate (trade name: Sansocizer E4030, available from New Japan Chemical Co., Ltd.) to set the SE type ECF motor.

The electrodes 3a and 3e were set to be positive electrodes and the remainders were grounded so as to be negative ones. Then, a direct-current-voltage of 6.0 kV was applied.

As a result, the SE type ECF motor began to rotate immediately after the application of voltage and continued to rotate at 45 rpm during the application of voltage. The current during the application of voltage was lower than the lower limit (0.05 mA) of the measurement by the ammeter.

Example Using 3,7-dimethyl1,6-octadien-3-yl acetate

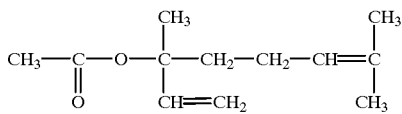

A direct-current-voltage of 6 kV was applied in the same manner as in Example 19, except that the SE type ECF motor having a vane motor with 6 vanes, which was used in Example 19, was filled with 3,7-dimethyl-1,6-octadien-3-yl acetate represented by the above formula (trade name: Linalyl Acetate, available from Kurarey Co., Ltd.).

As a result, the SE type ECF motor began to rotate immediately after the application of voltage and continued to rotate at 126 rpm during the application of voltage. The current during the application of voltage was lower than the lower limit (0.05 mA) of the measurement by the ammeter.

Example 26

The electrode 53 of the RE type ECF motor shown in FIG. 3 was set to be a positive electrode and the electrode 52 thereof was set to be a negative electrode. Supply of the electric power to the electrodes arranged on the cylindrical rotor was carried out through the rotational contact point of mercury. Arrangement of the electrodes and polarities thereof is shown in FIG. 3. The bearing section at the center of the bottom of the fluid container was provided with ball bearings to reduce friction of the shaft.

As shown in FIG. 3, a cylindrical rotor having a diameter of 20 mm and a height of 50 mm was arranged in the fluid container, and the container was filled with the following electro-sensitive movable fluids individually to completely immerse the whole rotor. The length of the electrode provided on the rotor was 50 mm, and the interval angle θ between the electrodes was 22.50.

When a direct-current-voltage of 6.0 kV was applied, the rotor began to rotate clockwise, and the rotary motion of the rotor was continued during the application of voltage. When the polarity of the applied voltage was reversed, the rotor began to rotate counterclockwise, and the counterclockwise rotation was continued.

The rotational speed (rad/s) for each movable fluid was measured. The results are set forth in Table 12.

The types I to V of the electro-sensitive movable fluids shown in Table 12 have structures represented by the following formulas.

Type I

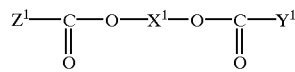

In the above formula, $X^1$ is a divalent group of 1 to 14 carbon atoms which may have either a branched chain, an ether linkage or an ester linkage, and $Y^1$ and $Z^1$ are each independently an alkyl group or 1 to 5 carbon atoms which may have a branch.

Type II

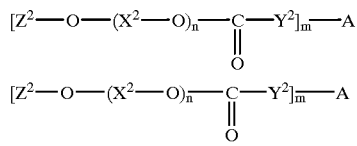

In the above formula, $X^2$ is a divalent alkyl group of 2 to 9 carbon atoms which may have a branch, $Y^2$ is a divalent alkyl group of 1 to 6 carbon atoms, $Z^2$ is an alkyl group of 1 to 6 carbon atoms which may have a branch, n is an integer of 1 to 4, m is an integer of 1 or 2. When m is 1, A is a hydrogen atom. When m is 2, the compound of this formula is a symmetric dimer having A as a bonding hand in which groups each represented by $(Z^2—O—(X^2—O—)_n—CO—Y^2—)—$ are directly bonded to each other.

Type III

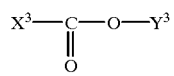

Type III

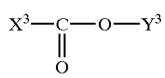

In the above formula, $X^3$ is a monovalent group having carbon atoms (a), oxygen atoms (b) and hydrogen atoms (2a+1−2b) wherein a is an integer of 1 to 25, b is 0, 1, 2 or 3, and 2a+1>2b, and $Y^3$ is a hydrocarbon group of 1 to 14 carbon atoms which may have a branched chain and/or a carbon-to-carbon double bond.

Type IV

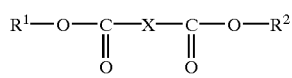

Type V

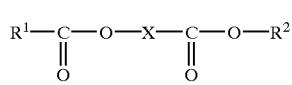

In the above formulas of the types IV and V, $R^1$ and $R^2$ are each independently a hydrocarbon group which may contain an atom other than carbon and hydrogen, $R^1$ and $R^2$ may be the same as or different from each other, and X is a divalent group represented by the following formula [VI] or [VII]:

[VI]

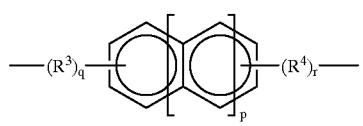

[VI]

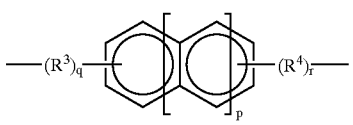

wherein $R^3$ and $R^4$ are each a hydrocarbon group which may have a branch and to which an atom other than carbon and hydrogen may be bonded, $R^3$ and $R^4$ may be the same as or different from each other, q and r are each independently 0 or an integer of 1 or more, when q or r is 0, $R^3$ and $R^4$ are each independently a single bond, p is 0 or an integer of 1, 2 or 3, a cyclic structure regulated by p may have a substituent, and the cyclic structure may be partly or wholly hydrogenated;

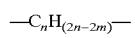 [VII]

wherein n is an integer of 2 or more, and m is the number of double bonds contained in this group.

Type VI

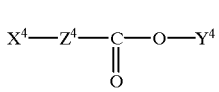

In the above formula, $Z^4$ is an alkyl group of 1 to 5 carbon atoms which contains any one of

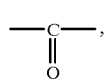

a single bond and —O—CH$_2$— and

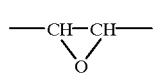

and which may have a branch, $X^4$ is a hydrocarbon group of 1 to 17 carbon atoms which may have a branch, $Y^4$ is a hydrocarbon group of 1 to 20 carbon atoms which may have a branch, and $X^4$ and $Y^4$ may have a hetero atom and/or an unsaturated bond.

TABLE 12

| Type | Electricity-sensitive working medium | Rotational speed (rad/s) |
|---|---|---|
| I | 2,2,4-Trimethyl-1,3-pentanediol diisobutyrate<br>Me—CH(—Me)—CH(—OC(=O)iPr)—C(Me)(Me)—CH$_2$—O—C(=O)—iPr | 16.5 |
| I | Glycerol triacetate<br>CH$_3$—OC(=O)—CH$_2$—CH(—O—CO—CH$_3$)—CH$_2$—O—CO—CH$_3$ | 9.6 |
| II | 2-Methoxy-1-methoxy-1-methylethyl acetate<br>CH$_3$—O—CH$_2$—CH(CH$_3$)—O—CO—CH$_3$ | 25.0 |
| II | Propylene glycol monoethyl ether acetate (mixture)<br>C$_2$H$_5$O—CH$_2$—CH(CH$_3$)—O—CO—CH$_3$ (90 wt.%) + C$_2$H$_5$O—CH(CH$_3$)—CH$_2$—O—CO—CH$_3$ (10 wt.%) | 17.4 |
| II | 3-Methoxy-3-methylbutyl acetate<br>CH$_3$—C(CH$_3$)(O—CH$_3$)—CH$_2$—CH$_2$—O—CO—CH$_3$ | 18.0 |
| II | Diethylene glycol butyl ether acetate<br>C$_4$H$_9$—O—(CH$_2$—CH$_2$O)$_2$—CO—CH$_3$ | 22.1 |
| III | 9,10-Epoxy butyl stearate<br>C$_8$H$_{17}$—CH—CH—(CH$_2$)$_7$—CO—C$_4$H$_7$ (epoxide O) | 7.3 |
| III | 3,7-Dimethyl-1,6-octadien-3-yl acetate<br>CH$_3$—C(=O)—O—C(CH$_3$)(CH=CH$_2$)—CH$_2$—CH$_2$—CH=C(CH$_3$)—CH$_3$ | 29.0 |
| IV | Dibutyl itaconate<br>C$_4$H$_9$CO—O—CH$_2$—C(=CH$_2$)—O—CO—C$_4$H$_9$ | 20.3 |
| IV | Dibutyl decanedioate<br>C$_4$H$_9$—O—CO—(CH$_2$)$_8$—CO—O—C$_4$H$_9$ | 14.0 |
| IV | Butyl benzyl phthalate<br>C$_6$H$_4$(COO—CH$_2$—C$_6$H$_5$)(COO—C$_4$H$_9$) | 5.8 |
| V | Methyl acetyl ricinoleate<br>H$_3$C—O—C(=O)—(CH$_2$)$_7$—CH=CH—CH$_2$—CH(C$_6$H$_5$)—O—CO—CH$_3$ | 6.9 |

In the use of each of the electro-sensitive movable fluids, the value of the direct current in the measurement of the rotational speed was lower than the lower limit (0.05 mA) of the measurement by the ammeter, and the accurate value was unable to be measured.

Example 27

The output torque (basic characteristics of the RE type ECF motor of the invention) was measured by the use of a measuring device shown in FIG. 11. In FIG. 11, the number 30 represents a RE type ECF motor.

The RE type ECF motor 30 used for the measurement had a structure shown in FIG. 3. The inner diameter of the fluid container was 30 mm. As for the cylindrical rotor, three kinds of rotors having a height of 50 mm and having different diameters, i.e., rotor A 10 mm in diameter, rotor B 16 mm in diameter and rotor C 20 mm in diameter, were used. The interval angle between the electrodes was 22.5°. The rotor C was the same rotor as used in Example 26.

As the electro-sensitive movable fluid, dibutyl decanedioate which was the same fluid as used in Example 26 was used. The fluid container was filled with the movable fluid to completely immerse the whole cylindrical rotor.

Then, a direct-current-voltage of 6.0 kV was applied. As a result, each of the rotors A to C began to rotate immediately after the application of voltage. The rotational speed, the output torque and the current were measured with respect to each rotor.

The results are set forth in Tables 13 to 15, respectively.

TABLE 13

Inner diameter of fluid container: 30 mm
Rotor A (diameter: 10 mm)

| Rotational speed (rad/s) | Output torque ($\mu$N·m) | Current ($\mu$A) |
|---|---|---|
| 30.6 | 0.0 | 12.0 |
| 20.9 | 5.5 | 12.0 |
| 14.0 | 12.3 | 12.0 |
| 11.3 | 14.7 | 12.0 |

TABLE 14

Inner diameter of fluid container: 30 mm
Rotor B (diameter: 16 mm)

| Rotational speed (rad/s) | Output torque ($\mu$N·m) | Current ($\mu$A) |
|---|---|---|
| 17.9 | 0.0 | 7.0 |
| 16.5 | 2.6 | 7.0 |
| 12.3 | 8.8 | 7.0 |
| 9.1 | 17.2 | 7.0 |

TABLE 15

Inner diameter of fluid container: 30 mm
Rotor C (diameter: 20 mm)

| Rotational speed (rad/s) | Output torque ($\mu$N·m) | Current ($\mu$A) |
|---|---|---|
| 12.6 | 0.0 | 6.0 |
| 11.6 | 3.2 | 6.0 |

TABLE 15-continued

Inner diameter of fluid container: 30 mm
Rotor C (diameter: 20 mm)

| Rotational speed (rad/s) | Output torque ($\mu$N·m) | Current ($\mu$A) |
|---|---|---|
| 8.7 | 13.3 | 6.0 |
| 8.1 | 20.8 | 6.0 |

As is clear from the results, with a larger diameter of the cylindrical rotor, a higher output torque was obtained. The reason is assumably that because of the narrow gap between the fluid container (housing) and the cylindrical rotor, the jet flow of the fluid produced between the electrodes is efficiently transformed to the rotary motion by means of the viscous force of the fluid.

Example 28

Fluid containers (housings) having inner diameters of 20 mm and 40 mm were prepared. In the fluid container having an inner diameter of 20 mm, the rotor A having a diameter of 10 mm which was used in Example 27 was set, while in the fluid container having an inner diameter of 40 mm, the rotor C having an inner diameter of 20 mm which was used in Example 27 was set. Then, the rotational speed, the output torque and the current were measured in the same manner as in Example 27.

The results are set forth in Table 16 and 17, respectively.

TABLE 16

Inner diameter of fluid container: 20 mm
Rotor A (diameter: 10 mm)

| Rotational speed (rad/s) | Output torque ($\mu$N.m) | Current ($\mu$A) |
|---|---|---|
| 30.6 | 0.0 | 12.0 |
| 19.3 | 4.8 | 12.0 |
| 11.4 | 16.1 | 12.0 |
| 7.9 | 19.3 | 12.0 |

TABLE 17

Inner diameter of fluid container: 40 mm
Rotor C (diameter: 20 mm)

| Rotational speed (rad/s) | Output torque ($\mu$N.m) | Current ($\mu$A) |
|---|---|---|
| 14.0 | 0.0 | 6.0 |
| 10.1 | 9.9 | 6.0 |
| 9.2 | 10.5 | 6.0 |

As is clear from the result, the ratio of the housing diameter to the rotor diameter in this example was 2.0, while the ratio of the housing diameter to the rotor diameter in Table 15 of Example 27 was 1.9. It was confirmed from the results that with decrease of the diameter of the housing, namely, with miniaturization of the housing, the output torque at the same rotational speed was increased and the change of the rotational speed for the output torque was increased.

Example 29

The rotational speed, output torque and the current were measured in the same manner as in Example 27, except that a fluid container having an inner diameter of 24 mm was used and three kinds of rotors having different interval angles of the electrodes, i.e., rotor C-2 having an interval angle θ of 11.3°, rotor C-3 having an interval angle of 45.0° and rotor C having an interval angle of 22.5°, were used.

The results are set forth in Tables 18 and 20, respectively.

TABLE 18

Inner diameter of fluid container: 24 mm
Rotor C-2 (diameter: 20 mm, θ: 11.3°)

| Rotational speed (rad/s) | Output torque (μN.m) | Current (μA) |
|---|---|---|
| 10.6 | 0.0 | 12.0 |
| 9.0 | 30.5 | 12.0 |
| 7.7 | 56.0 | 12.0 |
| 6.3 | 83.7 | 12.0 |

TABLE 19

Inner diameter of fluid container: 24 mm
Rotor C (diameter: 20 min, θ: 22.5°)

| Rotational speed (rad/s) | Output torque (μN.m) | Current (μA) |
|---|---|---|
| 12.6 | 0.0 | 6.0 |
| 12.0 | 9.4 | 6.0 |
| 10.5 | 35.5 | 6.0 |
| 8.6 | 58.4 | 6.0 |

TABLE 20

Inner diameter of fluid container: 24 mm
Rotor C-3 (diameter: 20 mm, θ: 45.0°)

| Rotational speed (rad/s) | Output torque (μN.m) | Current (μA) |
|---|---|---|
| 12.6 | 0.0 | 5.6 |
| 10.3 | 21.0 | 5.6 |
| 9.2 | 43.0 | 5.6 |
| 8.5 | 52.2 | 5.6 |

Example 30

The rotational speed was measured in the same manner as in Example 26, except that a mixture of dibutyl decanedioate (97.5% by weight) and petroleum benzine (2.5% by weight, available from Nippon Oil Co., Ltd.) was used as the electro-sensitive movable fluid. As a result, the rotational speed was 20.2 rad/s, and this speed was bigger rather than one containing only dibutyl decanedioate as a movable fluid described in Example 26 (14.0 radis). This means that the electric sensitivity of dibutyl decanedioate was improved and provided bigger rotational speed by adding petroleum benzine. The current was lower than the limit (0.5 mA) of the measurement by the ammeter.

What is claimed is:

1. A method of moving an electro-sensitive movable fluid comprising:

providing an electro-sensitive movable fluid composition comprising a hydrocarbon compound having 5 to 10 carbon atoms, and at least one compound having a conductivity σ plotted as abscissa, and a viscosity η, plotted as ordinate, located inside a triangle of a graph showing a relation between conductivity σ and viscosity η of a fluid at a working temperature, said triangle having, as vertices, a point P indicated by the conductivity $\sigma=4\times10^{-10}$ S/m and the viscosity $\eta=1\times10^{0}$ Pa·s, a point Q indicated by the conductivity $\sigma=4\times10^{-10}$ S/m and the viscosity $\eta=1\times10^{-4}$ Pa·s, and a point R indicated by the conductivity $\sigma=5\times10^{-6}$ S/m and the viscosity $\eta=1\times10^{-4}$ Pa·s, said composition being adjusted to have a conductivity σ and a viscosity η located inside said triangle, wherein said compound is selected from the group consisting of compounds having the general formula:

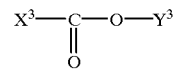

where $X^3$ is a monovalent group having 1–25 carbon atoms, 0–3 oxygen atoms of an epoxy group and (2a+1–2b) hydrogen atoms where (a) is an integer of 1 to 25, b is 0 to 3, such that 2a+1>2b; and where $Y^3$ is a linear hydrocarbon group of 1 to 14 carbon atoms or a hydrocarbon group of 1 to 14 carbon atoms having a branched chain and a carbon-to-carbon double bond, provided that when $X^3$ contains oxygen atoms, $Y^3$ is a linear hydrocarbon group, and when $X^3$ contains no oxygen atoms, $Y^3$ has a branched chain and carbon-to-carbon double bond, and applying a voltage between at least two electrodes arranged in the area of said electro-sensitive movable fluid to subject the electro-sensitive movable fluid to an electric field so as to move the electro-sensitive movable fluid.

2. A method of converting electric energy to mechanical energy, comprising the steps of:

arranging at least one pair of electrodes in the area of an electro-sensitive movable fluid composition, said fluid composition comprising a hydrocarbon compound having 5 to 10 carbon atoms, and at least one compound having a conductivity a, plotted as abscissa, and a viscosity η, plotted as ordinate, located inside a triangle of a graph showing a relation between conductivity σ and viscosity η of a fluid at a working temperature, said triangle having, as vertices, a point P indicated by the conductivity $\sigma=4\times10^{-10}$ S/m and the viscosity $\eta=1\times10^{0}$ Pa·s, a point Q indicated by the conductivity $\sigma=4\times10^{-10}$ S/m and the viscosity $\eta=1\times10^{-4}$ Pa·s, and a point R indicated by the conductivity $\sigma=5\times10^{-6}$ S/m and the viscosity $\eta=1\times10^{-4}$ Pa·s, said composition being adjusted to have a conductivity σ and a viscosity η located inside said triangle, wherein said compound is selected from the group consisting of compounds having the general formula:

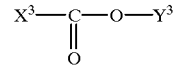

where $X^3$ is a monovalent group having 1–25 carbon atoms, 0–3 oxygen atoms of an epoxy group and (2a+1–2b) hydrogen atoms where (a) is an integer of 1 to 25, b is 0 to 3, such that 2a+1>2b; and where $Y^3$ is a linear hydrocarbon group of 1 to 14 carbon atoms or a hydrocarbon group of 1 to 14 carbon atoms having a branched chain and a carbon-to-carbon double bond, provided that when $X^3$ contains oxygen atoms, $Y^3$ is a linear hydrocarbon group, and when $X^3$ contains no oxygen atoms, $Y^3$ has a branched chain and carbon-to-carbon double bond, and applying a voltage between said electrodes to form jet flow of the electro-sensitive movable fluid at a velocity corresponding to the applied electric energy, and converting fluid energy of the jet flow of the electro-sensitive movable fluid to mechanical energy.

3. The method as claimed in claim 2, wherein said voltage is applied as a direct-current-voltage between said electrodes in a range of 0.1 V to 10 kV to control the flow velocity and the flow direction of the electro-sensitive movable fluid in proportion to the applied direct-current-voltage.

4. The method as claimed in claim 2 further comprising the steps of arranging said at least one pair of electrodes and a rotor in a container filled with said electro-sensitive movable fluid; and applying a direct-current-voltage between said electrodes to move the electro-sensitive movable fluid from one electrode to the other, wherein the direct-current-voltage applied between the electrodes can be changed to range between 0.1 V to 10 kV such that a rotational speed and a rotational direction of the rotor are proportional to the applied direct-current-voltage.

5. The method as claimed in claim 4, wherein said container further comprises a lid to close the container by being engaged with an open top of the container, said rotor being cylindrical and rotatable inside the container around a rotating shaft borne by a shaft hole provided at the center of the lid and a bearing section provided at the center of the bottom of the container, said at least one pair of electrodes including plural first electrodes which are electrically connected with external electrode terminals through the rotating shaft at an upper part of the cylindrical rotor and arranged in the vertical direction on the surface of the cylindrical rotor, and second electrodes which are electrically connected with external electrode terminals through the rotating shaft at a lower part of the cylindrical rotor and arranged in non-contact with the first electrodes and in the vertical direction on the surface of the cylindrical rotor.

6. The method as claimed in claim 5, wherein the plural first and second electrodes arranged in the vertical direction on the surface of the cylindrical rotor are each made of a conductive material and are arranged such that the interval angle between the electrodes is in the range of 1° to 180°.

7. The method as claimed in claim 1, wherein the point P is indicated by the conductivity $\sigma=5\times10^{-10}$ S/m and the viscosity $\eta=8\times10^{-1}$ Pa·s, the point Q is indicated by the conductivity $\sigma=5\times10^{-10}$ S/m and the viscosity $\eta=2\times10^{-4}$ Pa·s, and the point R is indicated by the conductivity $\sigma=2.5\times10^{-6}$ S/m and the viscosity $\eta=2\times10^{-4}$ Pa·s.

8. The method as recited in claim 1, wherein the compound is at least one compound selected from the group represented by the following formulas:

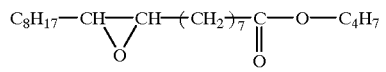

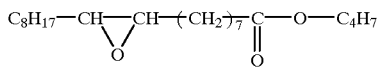

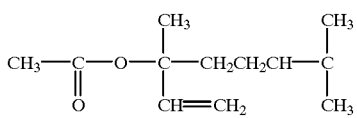

-continued

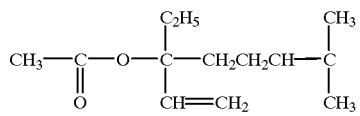

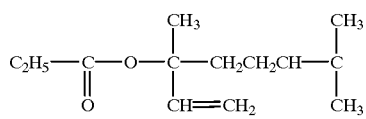

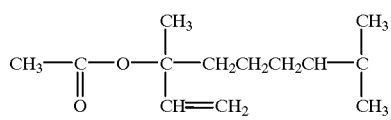

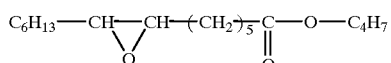

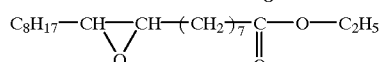

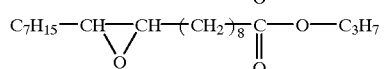

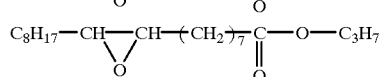

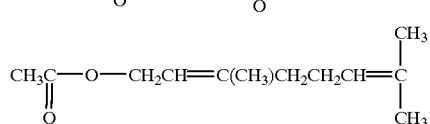

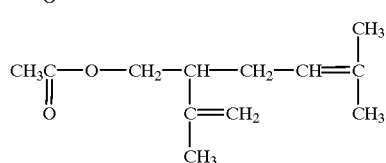

9. The method as claimed in claim 2, wherein the point P is indicated by the conductivity $\sigma=5\times10^{-10}$ S/m and the viscosity $\eta=8\times10^{-1}$ Pa·s, the point Q is indicated by the conductivity $\sigma=5\times10^{-10}$ S/m and the viscosity $\eta=2\times10^{-4}$ Pa·s, and the point R is indicated by the conductivity $\sigma=2.5\times10^{-6}$ S/m and the viscosity $\eta=2\times10^{-4}$ Pa·s.

10. The method as recited in claim 2, wherein the compound is at least one compound selected from the group represented by the following formulas:

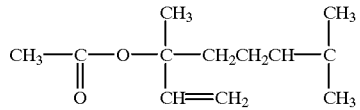

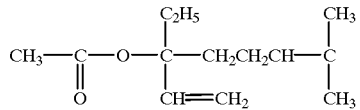

-continued
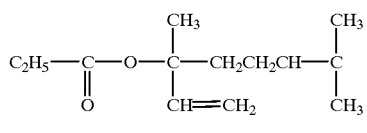
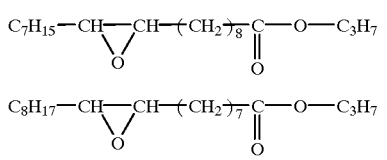
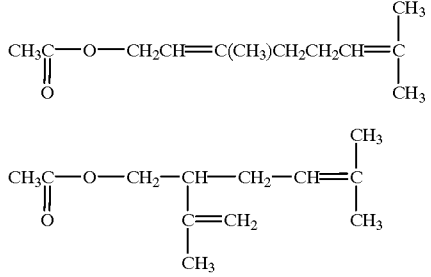
* * * * *

UNITED STATES PATENT AND TRADEMARK OFFICE
CERTIFICATE OF CORRECTION

PATENT NO. : 6,495,071 B1
DATED : December 17, 2002
INVENTOR(S) : Shinichi Yokota et al.

It is certified that error appears in the above-identified patent and that said Letters Patent is hereby corrected as shown below:

Column 5,
Line 49, "2 kVmm$^1$" should read -- 2 kVmm$^{-1}$ -- (insert negative).

Column 9,
Line 31, "$\eta=8.0' \ 10^{-4}$" should read -- $\eta=8.0 \times 10^{-4}$ --.

Column 12,
Line 35, "$Y_1$ and $Z^1$" should read -- $Y^1$ and $Z^1$ --.

Column 16,
Lines 21-25, delete entire formula (duplicate of formula on lines 28-30).

Column 17,
Line 31, "1 to 15carbon" should read -- 1 to 15 carbon --.

Column 19,
Line 36, "located is inside" should read -- located inside --.
Lines 53-54, "5 to carbon" should read -- 5 to 10 carbon --.

Column 20,
Line 39, "fluid-computer.." should read -- fluid-computer. --

Column 22,
Line 18, "house" should read -- housing --.

Column 31,
Line 30, "by symbol ✧." should read -- by symbol ◊. --.

Column 32,
Line 42, "conductivity G" should read -- conductivity σ --.
Line 43, "Pa s" should read -- Pa·s --.

UNITED STATES PATENT AND TRADEMARK OFFICE
CERTIFICATE OF CORRECTION

PATENT NO.   : 6,495,071 B1
DATED        : December 17, 2002
INVENTOR(S)  : Shinichi Yokota et al.

It is certified that error appears in the above-identified patent and that said Letters Patent is hereby corrected as shown below:

<u>Column 39,</u>
Line 65, "sensitivity.." should read -- sensitivity. --.

<u>Column 42,</u>
Line 44, "3,7-dimethyl1,6" should read -- 3,7-dimethyl-1,6 --.

<u>Column 43,</u>
Line 14, "22.50" should read -- 22.5º --.
Lines 43-45, delete duplicate Type II formula.
Lines 58-60, delete duplicate Type III formula.

<u>Column 44,</u>
Lines 21-25, delete duplicate Type VI formula.

<u>Column 49,</u>
Line 11, in heading of Table 18, "Rotar" should read -- Rotor --.
Line 22, in heading of Table 19, "20 min." should read -- 20 mm --.
Line 53, "(14.0 radis)" should read -- (14.0 rad/s). --.

<u>Column 50,</u>
Line 39, "conductivity a" should read -- conductivity σ --.

Signed and Sealed this

Twelfth Day of August, 2003

JAMES E. ROGAN
*Director of the United States Patent and Trademark Office*